United States Patent
Ishimoto et al.

(10) Patent No.: US 10,501,618 B2
(45) Date of Patent: Dec. 10, 2019

(54) EPOXY RESIN COMPOSITION, AND FILM, PREPREG, AND FIBER-REINFORCED PLASTIC USING SAME

(71) Applicant: Mitsubishi Chemical Corporation, Tokyo (JP)

(72) Inventors: Tomoko Ishimoto, Toyohashi (JP); Manabu Kaneko, Tokyo (JP); Tetsuya Atsumi, Toyohashi (JP); Kenichi Watanabe, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 262 days.

(21) Appl. No.: 15/100,556

(22) PCT Filed: Dec. 2, 2014

(86) PCT No.: PCT/JP2014/081903
§ 371 (c)(1),
(2) Date: May 31, 2016

(87) PCT Pub. No.: WO2015/083714
PCT Pub. Date: Jun. 11, 2015

(65) Prior Publication Data
US 2016/0297959 A1 Oct. 13, 2016

(30) Foreign Application Priority Data

Dec. 2, 2013 (JP) .................................. 2013-249270
Dec. 24, 2013 (JP) .................................. 2013-265176
Nov. 11, 2014 (JP) .................................. 2014-228508

(51) Int. Cl.
| | |
|---|---|
| B32B 27/38 | (2006.01) |
| B32B 27/04 | (2006.01) |
| B32B 1/08 | (2006.01) |
| C08G 59/24 | (2006.01) |
| C08G 59/26 | (2006.01) |
| C08L 63/00 | (2006.01) |
| C08J 5/24 | (2006.01) |
| C08G 59/22 | (2006.01) |
| C08G 59/20 | (2006.01) |
| C08G 59/44 | (2006.01) |
| C08J 5/04 | (2006.01) |
| C08J 5/18 | (2006.01) |
| C08G 59/32 | (2006.01) |
| C08G 59/40 | (2006.01) |
| C08K 7/06 | (2006.01) |

(52) U.S. Cl.
CPC .............. *C08L 63/00* (2013.01); *B32B 1/08* (2013.01); *B32B 27/04* (2013.01); *B32B 27/38* (2013.01); *C08G 59/20* (2013.01); *C08G 59/223* (2013.01); *C08G 59/226* (2013.01); *C08G 59/24* (2013.01); *C08G 59/245* (2013.01); *C08G 59/26* (2013.01); *C08G 59/3227* (2013.01); *C08G 59/4021* (2013.01); *C08G 59/44* (2013.01); *C08J 5/04* (2013.01); *C08J 5/18* (2013.01); *C08J 5/24* (2013.01); *C08K 7/06* (2013.01); *C08J 2363/00* (2013.01); *C08J 2463/00* (2013.01); *C08J 2463/02* (2013.01); *C08J 2471/00* (2013.01); *C08L 2205/02* (2013.01); *C08L 2205/03* (2013.01); *C08L 2205/16* (2013.01)

(58) Field of Classification Search
None
See application file for complete search history.

(56) References Cited

U.S. PATENT DOCUMENTS

| | | |
|---|---|---|
| 6,670,006 B1 | 12/2003 | Sugimori et al. |
| 2008/0160860 A1 | 7/2008 | Kuroki et al. |
| 2011/0184091 A1* | 7/2011 | Mizuki .............. C08G 59/4238 523/428 |
| 2012/0202071 A1 | 8/2012 | Kaneko et al. |

FOREIGN PATENT DOCUMENTS

| | | | |
|---|---|---|---|
| JP | 11-171972 A | | 6/1999 |
| JP | 2000-281747 A | | 10/2000 |
| JP | 2002-284852 A | | 10/2002 |
| JP | 2003183476 A | * 7/2003 | .............. C08L 63/00 |
| JP | 2003-277532 A | | 10/2003 |
| JP | 2005-298815 A | | 10/2005 |
| JP | 2011-74223 A | | 4/2011 |
| JP | 2012-196921 A | | 10/2012 |
| WO | 98/44017 A1 | | 10/1998 |
| WO | 2005/083002 A1 | | 9/2005 |

OTHER PUBLICATIONS

Machine translation of JP-2003183476-A (no date).*
International Search Report dated Feb. 24, 2015 in PCT/JP2014/081903 Filed Dec. 2, 2014.

* cited by examiner

*Primary Examiner* — Michael J Feely
(74) *Attorney, Agent, or Firm* — Oblon, McClelland, Maier & Neustadt, L.L.P.

(57) ABSTRACT

Provided are an epoxy resin composition which contains an epoxy resin and a curing agent, and satisfies the following (1), (2), and (3):
 (1) the bending elastic modulus of a cured product of the epoxy resin composition is 3.3 GPa or higher;
 (2) the bending strain at break of the cured product of the epoxy resin composition is 9% or higher; and
 (3) the fiber-reinforced plastic α formed of the cured product of the epoxy resin composition and a reinforcing fiber substrate in which carbon fibers, which are continuous fibers, are evenly aligned in one direction has 90° bending strength of 95 MPa or higher, and
a film, a prepreg, and fiber-reinforced plastic that are produced by using the epoxy resin composition.

18 Claims, 7 Drawing Sheets

[Fig. 1]
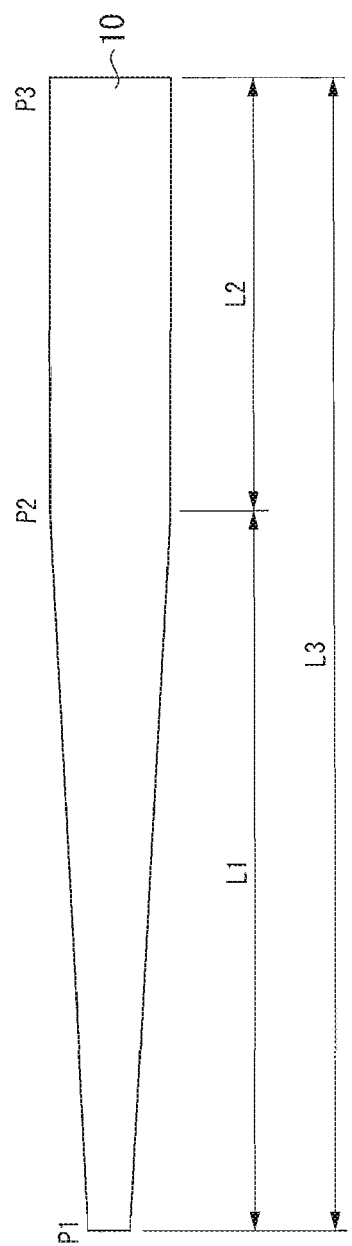

[Fig. 2A]
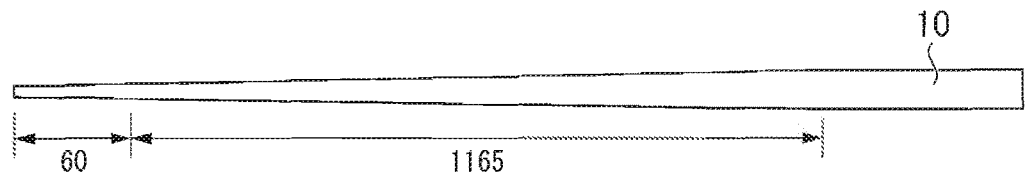
[Fig. 2B]
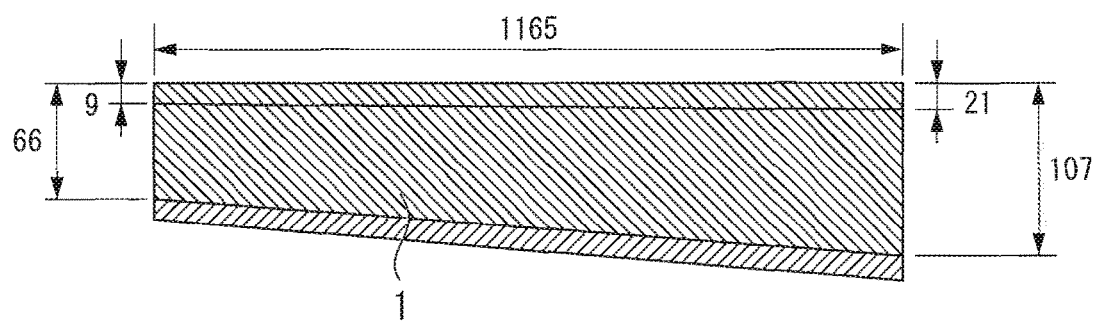
[Fig. 2C]
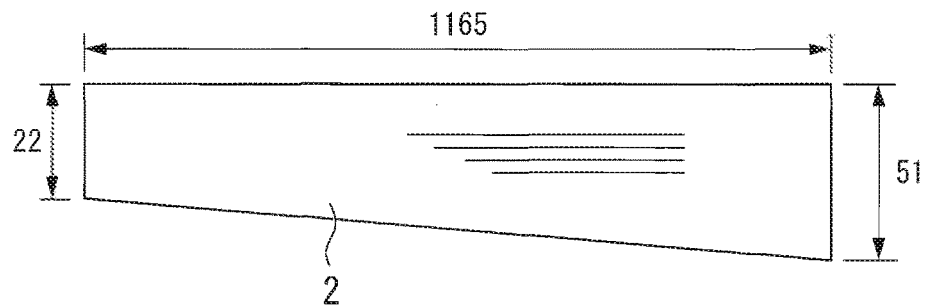

[Fig. 2D]
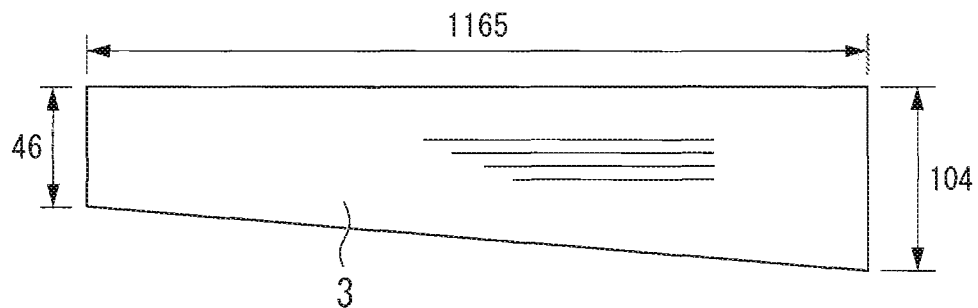
[Fig. 2E]
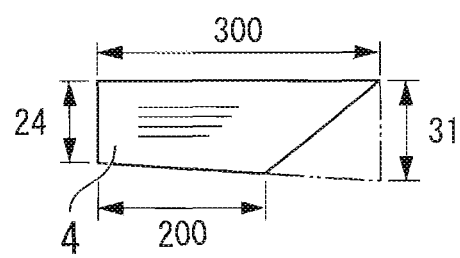
[Fig. 2F]
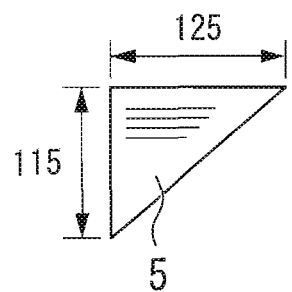

[Fig. 3A]
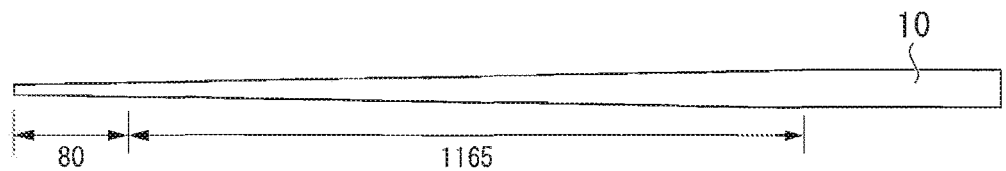
[Fig. 3B]
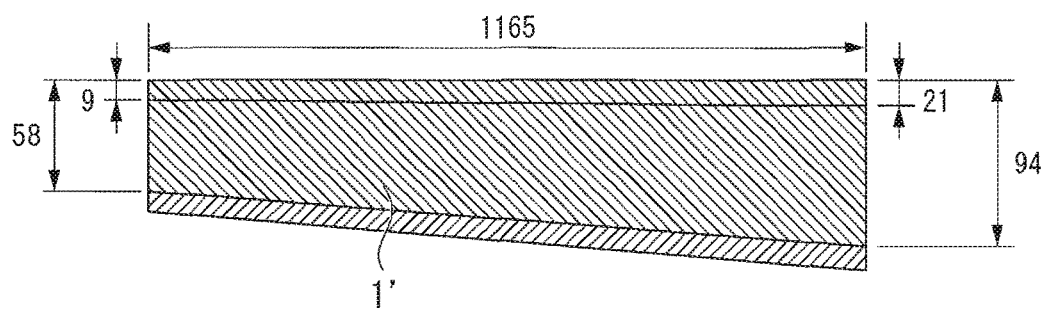
[Fig. 3C]
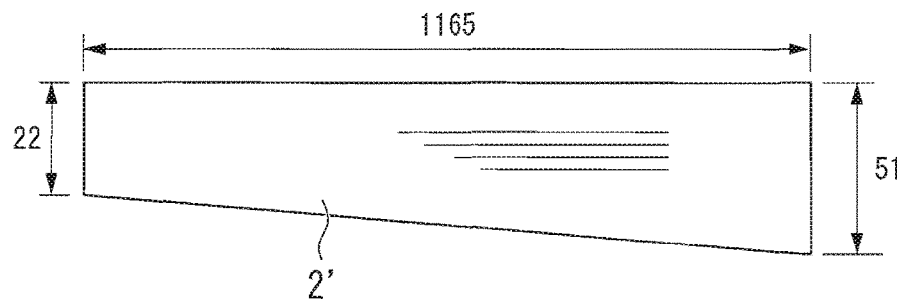

[Fig. 3D]
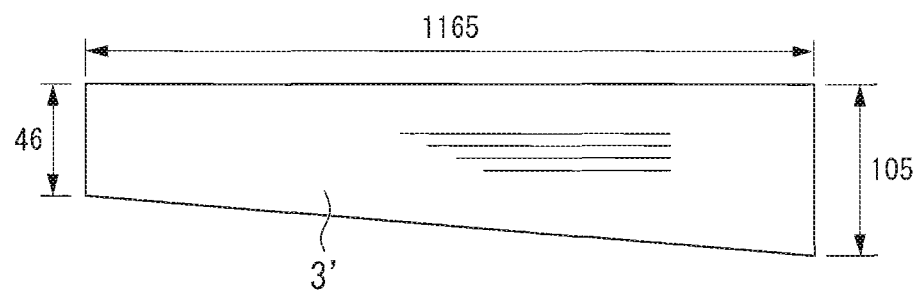
[Fig. 3E]
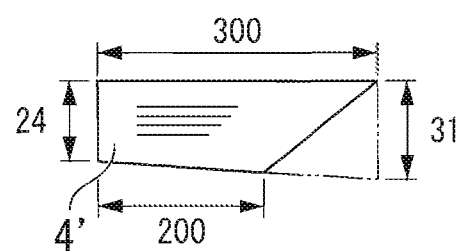
[Fig. 3F]
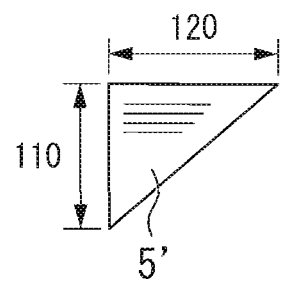

[Fig. 4A]
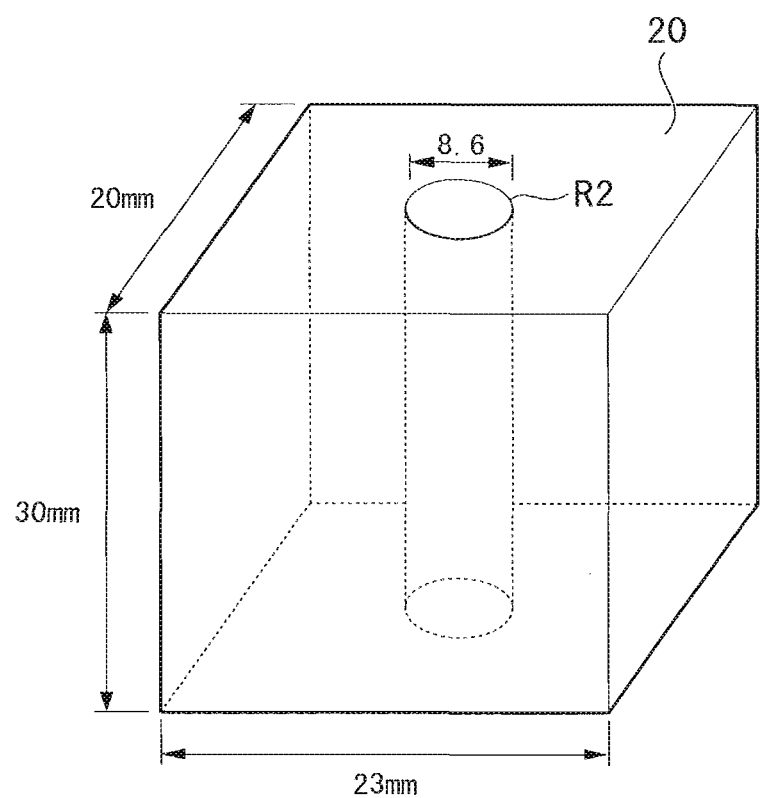

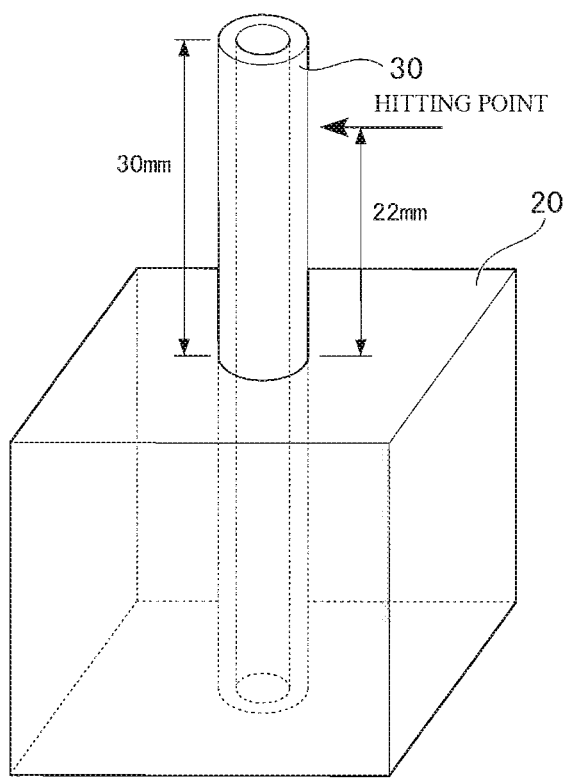
[Fig. 4B]

EPOXY RESIN COMPOSITION, AND FILM, PREPREG, AND FIBER-REINFORCED PLASTIC USING SAME

TECHNICAL FIELD

The present invention relates to an epoxy resin composition preferably used in a fiber-reinforced plastic for sports and leisure applications, industrial applications and the like and also relates to a film, a prepreg, and a fiber-reinforced plastic using the epoxy resin composition.

BACKGROUND ART

Fiber-reinforced plastics, which is one of the fiber-reinforced composite materials, have light weight, high strength, and high rigidity, and thus are widely used in products ranging from sports and leisure applications to industrial applications such as automobiles and aircrafts.

As a method for producing fiber-reinforced plastics, there is a method of using an intermediate material, that is, a prepreg, formed by impregnating a matrix resin composition in a substrate composed of long fiber (continuous fiber) such as reinforcing fiber. Such a method is advantageous in that the content of reinforcing fiber in fiber-reinforced plastics can be easily controlled and it is designed to have a large amount of reinforcing fiber.

Specific examples of a method for producing fiber-reinforced plastics from a prepreg include molding using an autoclave, compression molding, internal-pressurizing molding, oven molding, and sheet wrap molding.

Among fiber-reinforced plastics, fiber-reinforced plastic tubular bodies are widely used in sports and leisure applications such as fishing rods, golf club shafts, ski poles, or bicycle frames. With utilization of high elastic modulus of fiber-reinforced plastics, it is possible to hit a ball or a fishing hook a long distance with small force due to whip and reaction which occur at the time of swinging a tubular body. Furthermore, as light weight can be achieved by having a tubular body, operational feeling of a user can be improved.

In recent years, due to an increasing need for having light weight, it is attempted to use, as part of carbon fiber, fiber with higher elastic modulus, for example.

However, when carbon fiber with high elastic modulus is contained, fiber-reinforced plastics tend to have lower strength and are easy to break. As such, there is a limitation in use amount of carbon fiber with high elastic modulus. Furthermore, being highly expensive, the carbon fiber with high elastic modulus is disadvantageous from the economic point of view. Meanwhile, regarding fiber-reinforced plastics in which conventional carbon fiber is used, if the use amount of a prepreg is lowered to reduce the weight, the fracture strength of a tubular body is deteriorated.

Under the circumstances, the fracture strength of a fiber-reinforced plastic tubular body needs to be improved by a method other than the method based on modification of elastic modulus of carbon fiber.

To solve the problems described above, use of an epoxy resin composition as a matrix resin composition is suggested in Patent Document 1 and Patent Document 2, for example.

CITATION LIST

Patent Document

Patent Document 1: JP 2002-284852 A
Patent Document 2: JP 11-171972 A

SUMMARY OF THE INVENTION

Problem to be Solved by the Invention

However, the epoxy resin composition described in Patent Document 1 and Patent Document 2 is not sufficient in terms of mechanical properties, and thus a fiber-reinforced plastic tubular body with sufficient fracture strength cannot be obtained therefrom.

The present invention is devised under the circumstances described above, and fiber-reinforced plastics with excellent mechanical properties can be provided by the invention. In particular, it is to provide a fiber-reinforced plastic tubular body with excellent fracture strength, a prepreg which can be preferably used for production of such tubular body, and an epoxy resin composition which can be preferably used for production of the prepreg.

Means for Solving Problem

As a result of carrying out intensive studies, the inventors of the present invention found that the facture strength of a fiber-reinforced plastic tubular body is highly related with bending elastic modulus and bending strain at break of a cured product of an epoxy resin composition, and 90° bending strength of fiber-reinforced plastics that are produced by a specific method using such composition.

Namely, it was found that, by using an epoxy resin composition which exhibits high bending elastic modulus and high bending strain at break of a cured product and high 90° bending strength of fiber-reinforced plastics, fiber-reinforced plastics with high mechanical properties, in particular, a fiber-reinforced plastic tubular body with high fracture strength, can be provided. It was also found that, by using an epoxy resin composition which exhibits high 90° bending strain at break of fiber-reinforced plastics, a fiber-reinforced plastic with even higher fracture strength and formed in a tubular body can be yielded.

The inventors of the present invention also found that, by using an epoxy resin composition which exhibits both high bending elastic modulus and high bending strain at break of a cured product and has high tensile lap-shear strength using specific aluminum as a substrate, fiber-reinforced plastics with high mechanical properties, in particular, a fiber-reinforced plastic tubular body with high fracture strength, can be also yielded.

The inventors of the present invention also found that, by using a specific small molecule compound and a specific thermoplastic resin in combination with an oxazolidone ring-containing epoxy resin, fiber-reinforced plastics which have desired properties and are capable of solving the above problems can be provided.

Namely, the gist of the present invention is as described below.

[1] An epoxy resin composition which contains an epoxy resin and a curing agent, and satisfies the following (1), (2), and (3):
(1) the bending elastic modulus of a cured product of the epoxy resin composition is 3.3 GPa or higher;
(2) the bending strain at break of the cured product of the epoxy resin composition is 9% or higher; and
(3) the fiber-reinforced plastic α formed of the cured product of the epoxy resin composition and a reinforcing fiber substrate in which carbon fibers, which are continuous fibers, are evenly aligned in one direction has 90° bending strength of 95 MPa or higher.

[2] The epoxy resin composition described in [1], in which the 90° bending strain at break of the fiber-reinforced plastic α is 1.3% or higher.

[3] An epoxy resin composition which contains an epoxy resin and a curing agent, and satisfies the following (1), (2), and (4):

(1) the bending elastic modulus of a cured product of the epoxy resin composition is 3.3 GPa or higher;

(2) the bending strain at break of the cured product of the epoxy resin composition is 9% or higher; and (4) tensile lap-shear strength is 9.5 MPa or higher when measurement is made based on JIS K 6850 by using A5052 aluminum as a subject for adhesion.

[4] The epoxy resin composition described in any one of [1] to [3], in which the epoxy resin contains:

an oxazolidone ring-containing epoxy resin, which is not a glycidylamine type epoxy resin, as a component (A);

a glycidylamine type epoxy resin not having an oxazolidone ring as a component (B-1);

a bisphenol type bifunctional epoxy resin having the number average molecular weight of 600 or more, which does not have oxazolidone ring and is not a glycidylamine type epoxy resin, as a component (C); and a phenoxy resin as a component (D) and a curing agent as a component (E).

[4-1] The epoxy resin composition described in [4], in which the component (B-1) is glycidylanilines.

[4-2] The epoxy resin composition described in [4-1], in which the component (B-1) is N,N-diglycidyl-o-toluidine.

[4-3] The epoxy resin composition described in any one of [4] to [4-2], in which the content of the component (B-1) is 1 part by mass to 30 parts by mass relative to 100 parts by mass of the total amount of the epoxy resin contained in the epoxy resin composition.

[4-4] The epoxy resin composition described in any one of [4] to [4-3], in which the content of the component (D) is 1 part by mass to 15 parts by mass relative to 100 parts by mass of the total amount of the epoxy resin contained in the epoxy resin composition.

[4-5] The epoxy resin composition described in any one of [4] to [4-4], in which the content of the component (A) is 30 parts by mass to 70 parts by mass relative to 100 parts by mass of the total amount of the epoxy resin contained in the epoxy resin composition.

[4-6] The epoxy resin composition described in any one of [4] to [4-5], in which a component (F) a urea type curing aid is further contained.

[4-7] The epoxy resin composition described in any one of [4] to [4-6], in which a component (G) a low viscosity epoxy resin (with the proviso that, it does not contain an oxazolidone ring and is neither a diglycidylamine type epoxy resin nor glycidylphthalimide) is further contained.

[4-8] The epoxy resin composition described in [4-7], in which the total amount of the components (A), (B-1), (C), (D), and (G) is 75 parts by mass or more relative to 100 parts by mass of the total amount of the epoxy resin contained in the epoxy resin composition.

[4-9] The epoxy resin composition described in [4-7] or [4-8], in which part or all of the component (G) is a bisphenol F type epoxy resin.

[4-10] The epoxy resin composition described in any one of [4] to [4-9], in which the content of the component (C) is 5 parts by mass to 30 parts by mass relative to 100 parts by mass of the total amount of the epoxy resin contained in the epoxy resin composition.

[5] The epoxy resin composition described in any one of [1] to [3], in which the epoxy resin contains:

an oxazolidone ring-containing epoxy resin, which is not a glycidylamine type epoxy resin, as a component (A);

glycidylphthalimide as a component (B-2);

a bisphenol type bifunctional epoxy resin having the number average molecular weight of 600 or more, which does not have an oxazolidone ring and is not a glycidylamine type epoxy resin, as a component (C); and a phenoxy resin as a component (D) and a curing agent as a component (E).

[5-1] The epoxy resin composition described in [5], in which the content of the component (B-2) is 1 part by mass to 15 parts by mass relative to 100 parts by mass of the total amount of the epoxy resin contained in the epoxy resin composition.

[5-2] The epoxy resin composition described in [5] or [5-1], in which the content of the component (D) is 1 part by mass to 15 parts by mass relative to 100 parts by mass of the total amount of the epoxy resin contained in the epoxy resin composition.

[5-3] The epoxy resin composition described in any one of [5] to [5-2], in which the content of the component (A) is 30 parts by mass to 70 parts by mass relative to 100 parts by mass of the total amount of the epoxy resin contained in the epoxy resin composition.

[5-4] The epoxy resin composition described in any one of [5] to [5-3], in which a component (F) a urea type curing aid is further contained.

[5-5] The epoxy resin composition described in any one of [5] to [5-4], in which a component (G) a low viscosity epoxy resin (with the proviso that, it does not contain an oxazolidone ring and is neither a diglycidylamine type epoxy resin nor glycidylphthalimide) is further.

[5-6] The epoxy resin composition described in [5-5], in which the total amount of the components (A), (B-2), (C), (D), and (G) is 75 parts by mass or more relative to 100 parts by mass of the total amount of the epoxy resin contained in the epoxy resin composition.

[5-7] The epoxy resin composition described in [5-5] or [5-6], in which part or all of the component (G) is a bisphenol F type epoxy resin.

[5-8] The epoxy resin composition described in any one of [5] to [5-7], in which the content of the component (C) is 5 parts by mass to 30 parts by mass relative to 100 parts by mass of the total amount of the epoxy resin contained in the epoxy resin composition.

[6] An epoxy resin composition which contains:

an oxazolidone ring-containing epoxy resin, which is not a glycidylamine type epoxy resin, as a component (A);

a glycidylamine type epoxy resin not having an oxazolidone ring as a component (B-1); a bisphenol type bifunctional epoxy resin having the number average molecular weight of 600 or more, which does not have an oxazolidone ring and is not a glycidylamine type epoxy resin, as a component (C);

a phenoxy resin as a component (D);

a curing agent as a component (E); and a low viscosity epoxy resin, which does not contain an oxazolidone ring and is neither a diglycidylamine type epoxy resin nor glycidylphthalimide, as a component (G), in which the total amount of the components (A), (B-1), (C), and (G) is 75 parts by mass or more relative to 100 parts by mass of the total amount of the epoxy resin contained in the epoxy resin composition.

[6-1] The epoxy resin composition described in [6], in which the content of the component (B-1) is 1 part by mass to 30 parts by mass relative to 100 parts by mass of the total amount of the epoxy resin contained in the epoxy resin composition.

[6-2] The epoxy resin composition described in [6] or [6-1], in which the content of the component (D) is 1 part by mass to 15 parts by mass relative to 100 parts by mass of the total amount of the epoxy resin contained in the epoxy resin composition.

[7] An epoxy resin composition which contains:
an oxazolidone ring-containing epoxy resin, which is not a glycidylamine type epoxy resin, as the component (A);
glycidylphthalimide as the component (B-2);
a bisphenol type bifunctional epoxy resin having the number average molecular weight of 600 or more, which does not have oxazolidone ring and is not a glycidylamine type epoxy resin, as the component (C);
a phenoxy resin as the component (D);
a curing agent as the component (E); and
a low viscosity epoxy resin, which does not contain an oxazolidone ring and is neither a diglycidylamine type epoxy resin nor glycidylphthalimide, as the component (G), in which
the total amount of the components (A), (B-2), (C), and (G) is 75 parts by mass or more relative to 100 parts by mass of the total amount of the epoxy resin contained in the epoxy resin composition.

[7-1] The epoxy resin composition described in [7], in which the content of the component (B-2) is 1 part by mass to 15 parts by mass relative to 100 parts by mass of the total amount of the epoxy resin contained in the epoxy resin composition.

[7-2] The epoxy resin composition described in [7] or [7-1], in which the content of the component (D) is 1 part by mass to 15 parts by mass relative to 100 parts by mass of the total amount of the epoxy resin contained in the epoxy resin composition.

[8] A film composed of the epoxy resin composition described in any one of [1] to [7-2].

[9] A prepreg having the epoxy resin composition described in any one of [1] to [7-2] impregnated in a reinforcing fiber substrate.

[10] A fiber-reinforced plastic composed of a cured product of the epoxy resin composition described in any one of [1] to [7-2] and a reinforcing fiber.

[11] The fiber-reinforced plastics described in [10], having a tubular shape.

Effect of the Invention

By using the epoxy resin composition of the present invention, fiber-reinforced plastics with excellent mechanical properties, in particular, a fiber-reinforced plastic tubular body with excellent fracture strength, can be obtained.

BRIEF DESCRIPTION OF DRAWINGS

FIG. 1 is a schematic drawing illustrating the shape of a mandrel that is used in Examples;

FIG. 2A is a schematic drawing illustrating a mandrel used in shaft tests 1 to 3 of Examples;

FIG. 2B is a schematic drawing illustrating the shape of a first winding sheet (prepreg) which is firstly wound around a mandrel in shaft tests 1 to 3 of Examples;

FIG. 2C is a schematic drawing illustrating the shape of a second winding sheet (prepreg) which is secondly wound around a mandrel in shaft tests 1 to 3 of Examples;

FIG. 2D is a schematic drawing illustrating the shape of a third winding sheet (prepreg) which is thirdly wound around a mandrel in shaft tests 1 to 3 of Examples;

FIG. 2E is a schematic drawing illustrating the shape of a fourth winding sheet (prepreg) which is fourthly wound around a mandrel in shaft tests 1 to 3 of Examples;

FIG. 2F is a schematic drawing illustrating the shape of a fifth winding sheet (prepreg) which is fifthly wound around a mandrel in shaft tests 1 to 3 of Examples;

FIG. 3A is a schematic drawing illustrating a mandrel used in shaft tests 4 and 5 of Examples;

FIG. 3B is a schematic drawing illustrating the shape of a first winding sheet (prepreg) which is firstly wound around a mandrel in shaft tests 4 and 5 of Examples;

FIG. 3C is a schematic drawing illustrating the shape of a second winding sheet (prepreg) which is secondly wound around a mandrel in shaft tests 4 and 5 of Examples;

FIG. 3D is a schematic drawing illustrating the shape of a third winding sheet (prepreg) which is thirdly wound around a mandrel in shaft tests 4 and 5 of Examples;

FIG. 3E is a schematic drawing illustrating the shape of a fourth winding sheet (prepreg) which is fourthly wound around a mandrel in shaft tests 4 and 5 of Examples;

FIG. 3F is a schematic drawing illustrating the shape of a fifth winding sheet (prepreg) which is fifthly wound around a mandrel in shaft tests 4 and 5 of Examples;

FIG. 4A is a schematic drawing illustrating the jig which is used for the izod impact test of Examples; and FIG. 4B is a schematic drawing illustrating the test method of an izod impact test, in which the jig shown in FIG. 4A is used, of Examples.

MODE(S) FOR CARRYING OUT THE INVENTION

The present invention lies in an epoxy resin composition which contains an epoxy resin and a curing agent and satisfies the following (1), (2), and (3), and use of the composition.

(1) The bending elastic modulus of a cured product of the epoxy resin composition is 3.3 GPa or higher.

(2) The bending strain at break of the cured product of the epoxy resin composition is 9% or higher.

(3) The fiber-reinforced plastic α formed of the cured product of the epoxy resin composition and a reinforcing fiber substrate in which carbon fibers, which are continuous fibers, are evenly aligned in one direction has 90° bending strength of 95 MPa or higher.

Furthermore, it is preferable for the epoxy resin composition of the present invention that the fiber-reinforced plastic α has 90° bending strain at break of 1.3% or higher.

Meanwhile, in the present invention, the "fiber-reinforced plastic α" means a fiber-reinforced plastic which is formed of a cured product of the epoxy resin composition and a reinforcing fiber substrate in which carbon fibers, which are continuous fibers, are evenly aligned in one direction. More specifically, it means a fiber-reinforced plastic which is obtained by impregnating an epoxy resin composition in a reinforcing fiber substrate in which carbon fibers are evenly aligned in one direction to prepare a unidirectional prepreg which has fiber weight per unit area of 125 g/m$^2$ and the resin content of 28% by mass, and by stacking 18 pieces of the prepregs such that the fibers are in the same direction followed by curing.

In a cured product of the epoxy resin composition, the bending elastic modulus and bending strain at break are in a trade-off relationship. However, as a result of intensive studies, the inventors of the present invention found that both of them can be maintained at high level by controlling those physical properties within a specific range. By using such an epoxy resin composition, the fiber-reinforced plastic to be obtained can have improved fracture strength It was also found that, regarding the epoxy resin composition, when the 90° bending strength of the fiber-reinforced plastic α which is produced by using the composition is controlled within a specific range, the fracture strength of a fiber-reinforced plastic tubular body produced by using the epoxy resin composition can be more effectively improved.

It was also found that, although the 90° bending strength and bending strain at break of the fiber-reinforced plastic α cannot be obtained simultaneously according to the technique of a related art, both can be obtained at high level if they are controlled within a specific range. It was found that, by using such an epoxy resin composition, the fracture strength of a fiber-reinforced plastic to be obtained can be significantly improved.

The present invention also relates to an epoxy resin composition which contains at least an epoxy resin and a curing agent, and satisfies the following (1), (2), and (4), and use thereof:

(1) the bending elastic modulus of a cured product of the epoxy resin composition is 3.3 GPa or higher,
(2) the bending strain at break of the cured product of the epoxy resin composition is 9% or higher,
(4) tensile lap-shear strength is 9.5 MPa or higher when measurement is made based on JIS K 6850 by using A5052 aluminum as a subject for adhesion.

The inventors of the present invention further found that, when an epoxy resin composition in which the bending elastic modulus and bending strain at break are maintained at high level is used and the tensile lap-shear strength using specific aluminum as a substrate is set to be the same or higher than a specific value, fracture strength of a fiber-reinforced plastic tubular body produced by using the epoxy resin composition can be also significantly improved.

As described herein, a cured product of the epoxy resin composition may be referred to as a "cured resin product", "bending elastic modulus of a cured product of the epoxy resin composition" may be referred to as "resin bending elastic modulus", "bending strain at break of a cured product of the epoxy resin composition" may be referred to as "resin bending strain at break", "90° bending strength of the fiber-reinforced plastic α formed of a cured product of the epoxy resin composition and a reinforcing fiber substrate in which carbon fibers, which are continuous fibers, are evenly aligned in one direction" may be simply referred to as "90° bending strength of fiber-reinforced plastic α", and "90° bending strain at break of the fiber-reinforced plastic α formed of a cured product of the epoxy resin composition and a reinforcing fiber substrate in which carbon fibers, which are continuous fibers, are evenly aligned in one direction" may be simply referred to as "90° bending strain at break of fiber-reinforced plastic α".

In general, the term "epoxy resin" is used as a name of one category of thermocurable resins, or a name of a category of chemical substances as a compound having an epoxy group in the molecule. In the present invention, it is used with the latter meaning (with the proviso that, the weight average molecular weight of the epoxy resin is less than 50000). Furthermore, the term "epoxy resin composition" means a composition which contains an epoxy resin, a curing agent, and depending on a case, other additives.

Meanwhile, in this specification, the term "to" means a range which includes the numerical values and ratios that are described before and after the "to". Furthermore, the "room temperature" indicates a temperature range of from 10 to 30° C.

Hereinbelow, the present invention is described in detail.

[Physical Properties]

"(1) Resin Bending Elastic Modulus of 3.3 GPa or Higher"

The resin bending elastic modulus described in the present invention indicates a value which is measured by the following method.

A 2 mm-thick cured resin sheet obtained by curing the epoxy resin composition is processed into a test piece (60 mm long×8 mm wide). Then, elastic modulus of the test piece is measured by using INSTRON 4465 tester equipped with a 500 N load cell (manufactured by Instron Corporation) and using a three-point bending jig (load applicator R=3.2 mm, support R=1.6 mm) under conditions of temperature at 23° C. and humidity of 50% RH. At that time, distance (L) between supports of a jig and thickness (d) of the test piece are set at a ratio (L/d) of 16 and the test piece is bent to obtain elastic modulus.

When the epoxy resin composition of which resin bending elastic modulus is 3.3 GPa or higher is used as a matrix resin composition of a fiber-reinforced plastic, the obtained fiber-reinforced plastic has high 0° bending strength. In addition, when the fiber-reinforced plastic has a tubular shape, the tubular body has high bending strength.

It is sufficient that the resin bending elastic modulus is 3.3 GPa or higher. However, if it is 3.4 GPa or higher, a fiber-reinforced plastic with even higher 0° bending strength and 90° bending strength can be obtained, and therefore preferable. The upper limit of the resin bending elastic modulus is, although not particularly limited, 6.0 GPa or lower in general.

"(2) Resin Bending Strain at Break of 9% or Higher"

The resin bending strain at break is a value which is measured by the following method.

A 2 mm-thick cured resin sheet obtained by curing the epoxy resin composition is processed into a test piece (60 mm long×8 mm wide). Then, strain of the test piece is measured by using INSTRON 4465 tester equipped with a 500 N load cell (manufactured by Instron Corporation) and using a three-point bending jig (load applicator R=3.2 mm, support R=1.6 mm) under conditions of temperature at 23° C. and humidity of 50% RH. At that time, distance (L) between supports of a jig and thickness (d) of the test piece are set at a ratio (L/d) of 16 and the test piece is bent to obtain strain under maximum load and strain at break. If the test piece is not broken even after bending, the device is stopped when the strain is more than 13%, and the value at that time is taken as strain at break.

When an epoxy resin composition of which the resin bending strain at break is 9% or higher is used as a matrix resin of a fiber-reinforced plastic, the obtained fiber-reinforced plastic can have high 90° bending strength. Furthermore, when the fiber-reinforced plastic has a tubular shape, the tubular body has high bending strength.

It is sufficient that the resin bending strain at break is 9% or higher. However, when it is 11% or higher, a fiber-reinforced plastic with even higher 90° bending strength can be obtained, and thus more preferable. It is even more preferably 12% or higher. The upper limit of the resin bending strain at break is 13% as it is clearly shown by the measurement method described above.

"(3) 90° Bending Strength of 95 MPa or Higher for Fiber-Reinforced Plastic α"

The 90° bending strength of the fiber-reinforced plastic α indicates a value which is measured by the following method.

First, by impregnating an epoxy resin composition in a reinforcing fiber substrate in which carbon fibers are evenly aligned in one direction, a unidirectional prepreg which has fiber weight per unit area of 125 g/m² and the resin content of 28% by mass is produced. Then, 18 pieces of the prepregs are stacked so as to have fiber direction of $[0°]_{18}$ followed by curing to produce a fiber-reinforced plastic panel (fiber-reinforced plastic α).

The obtained fiber-reinforced plastic α is processed into a test piece (130 mm long×12.7 mm wide) in such a way that reinforcing fibers have an orientation angle of 90° to a long side of the test piece. Then, bending strength and strain at break of the test piece are measured by using a universal testing instrument manufactured by Instron Corporation and using a three-point bending jig (load applicator R=5 mm, support R=3.2 mm) under conditions of temperature at 23° C. and humidity of 50% RH. Meanwhile, distance (L) between supports of a jig and thickness (d) of the test piece are set as follows: a ratio (L/d)=16, and a crosshead speed (rate per minute)=(L²×0.01)/(6×d). The test piece is then bent and bending strength and strain at break are measured.

When the fiber-reinforced plastic α has 90° bending strength of 100 MPa or higher, by using an epoxy resin composition that is used for the fiber-reinforced plastic α, a fiber-reinforced plastic tubular body with high bending strength is obtained. It is sufficient that the fiber-reinforced plastic α has 90° bending strength of 95 MPa or higher. However, if it is 100 MPa or higher, a tubular body with even higher bending strength is obtained, and thus more preferable. It is even more preferably 105 MPa or higher.

Furthermore, when the fiber-reinforced plastic α has 90° bending strain at break of 1.3% or higher, a tubular body with even higher bending strength is obtained. It is more preferably 1.4% or higher.

By using an epoxy resin composition satisfying the above (1) to (3), a fiber-reinforced plastic tubular body with high fracture strength is obtained.

By using an epoxy resin composition with high resin bending elastic modulus, a fiber-reinforced plastic tubular body which is obtained by using the composition has suppressed deformation of an entire tubular body or tube distortion under bending compression, and a break caused by buckling of carbon fibers is less likely to occur. Furthermore, when the 90° bending strength of fiber-reinforced plastic α produced by using the epoxy resin composition is high, the adhesive strength between a cured product of the epoxy resin composition and reinforcing fiber is sufficiently high so that delamination at an interface between the reinforcing fiber and cured resin product is suppressed.

Furthermore, when the epoxy resin composition has high resin bending strain at break, a cured product of the epoxy resin composition is appropriately elongated and the fiber-reinforced plastic containing it is unlikely to have a breaking starting point. As such, a fiber-reinforced plastic tubular body of which the resin bending elastic modulus, resin bending strain at break, and 90° bending strength of fiber-reinforced plastic α are all high is unlikely to have breaking start points, which are caused by deformation or tube distortion under bending compression, and thus high fracture strength can be exhibited.

As described above, those physical properties are in a trade-off relationship with each other and thus it remained difficult to satisfy all of them. However, as a result of intensive studies, the inventors of the present invention found that they can be satisfied by controlling each property within the ranges (1) to (3) that are described above.

Namely, it is believed that, by satisfying all of the above (1) to (3), fracture strength of a fiber-reinforced plastic tubular body can be significantly improved.

"(4) Tensile Lap-Shear Strength"

The "tensile lap-shear strength" described in the present invention indicates a value which is measured based on JIS K 6850 by using A5052 aluminum.

According to determination of the inventors of the present invention, it was found that the epoxy resin composition with tensile lap-shear strength of 9.5 MPa or higher has sufficiently high adhesive strength between a cured product of the epoxy resin composition and reinforcing fiber so that delamination at an interface between the reinforcing fiber and cured resin product is suppressed in fiber-reinforced plastics. As a result, by using the epoxy resin composition, a fiber-reinforced plastic tubular body with high bending strength can be obtained. It is sufficient that the tensile lap-shear strength is 9.5 MPa or higher. It is more preferably 10 MPa or higher.

As described above, by using the epoxy resin composition satisfying the above (1) to (3) above, a fiber-reinforced plastic tubular body with high fracture strength can be obtained. However, even if the epoxy resin composition satisfying the above (1) and (2) and the above-described (4) is used, a fiber-reinforced plastic tubular body with high fracture strength can be similarly obtained.

[Composition]

As a method for improving the resin bending elastic modulus, there are methods such as increasing the crosslinking density of a resin, adding a hard filler, or using a resin having a cyclic skeleton. However, any of those methods generally has a tendency of lowering the resin bending strain at break.

Furthermore, to improve the resin bending strain at break, there are methods such as increasing the molecular weight between crosslinking points of a resin, adding a thermoplastic resin, or the like. However, any of those methods generally has a tendency of lowering the resin bending elastic modulus.

Namely, being in a trade-off relationship, the resin bending elastic modulus and resin bending strain at break are the properties that are difficult to be obtained at the same time.

The inventors of the present invention improved the resin bending strain at break by using an epoxy resin having a suitable number of epoxy groups in one molecule and relatively high molecular weight in combination with a specific thermoplastic resin, for example. It was also found that, if a specific small molecule compound having an epoxy group is used, for example, to recover a decrease in resin bending elastic modulus. As a result, the inventors successfully improved the resin bending elastic modulus without lowering the resin bending strain at break.

As a specific small molecule compound having an epoxy group, for example, a small molecule compound filling free volume between crosslinkings of a resin is more preferable. However, a reactive resin having small molecule generally has a tendency of lowering the glass transition temperature of a cured resin product. It was found that the combined use of an oxazolidone ring-containing resin is effective for solving such problem.

Specific examples of the specific small molecule compound having an epoxy group include a glycidylamine type epoxy resin and glycidylphthalimide. Details are described hereinbelow.

The epoxy resin composition of the present invention can be prepared by suitably selecting materials from known compounds to satisfy each physical property described above. In particular, the following [Composition 1] and [Composition 2] are preferable in that each physical property described above can be easily satisfied by them.

[Composition 1]

An epoxy resin composition which contains the following components (A), (B-1), (C), (D), and (E):

the component (A) oxazolidone ring-containing epoxy resin (with the proviso that, it is not a glycidylamine type epoxy resin);

the component (B-1) glycidylamine type epoxy resin (with the proviso that, it does not have an oxazolidone ring);

the component (C) bisphenol type bifunctional epoxy resin having the number average molecular weight of 600 or more (with the proviso that, it does not have an oxazolidone ring and it is not a glycidylamine type epoxy resin);

the component (D) phenoxy resin; and the component (E) curing agent.

[Composition 2]

An epoxy resin composition which contains the following components (A), (B-2), (C), (D), and (E):

the component (A) oxazolidone ring-containing epoxy resin (with the proviso that, it is not a glycidylamine type epoxy resin);

the component (B-2) glycidylphthalimide;

the component (C) bisphenol type bifunctional epoxy resin having the number average molecular weight of 600 or more (with the proviso that, it does not have an oxazolidone ring and it is not a glycidylamine type epoxy resin);

the component (D) phenoxy resin; and the component (E) curing agent.

Meanwhile, in the present specification, "Compositions 1 and 2" indicate each of Composition 1 and Composition 2."

Hereinbelow, detailed descriptions are given for each component.

"Component (A) oxazolidone ring-containing epoxy resin (with the proviso that, it is not a glycidylamine type epoxy resin)"

The aforementioned Compositions 1 and 2 contain, as the component (A), an epoxy resin which contains an oxazolidone ring structure in the molecule (with the proviso that, it is not a glycidylamine type epoxy resin) (hereinbelow, it is simply referred to as an "oxazolidone ring-containing epoxy resin"). The expression "it is not a glycidylamine type epoxy resin" herein means an epoxy resin not having a glycidylamino group in the molecule.

The heat resistance of the cured products of Compositions 1 and 2 is enhanced by the oxazolidone ring-containing epoxy resin. The oxazolidone ring-containing epoxy resin also has an effect of increasing the adhesiveness between cured products of Compositions 1 and 2 and reinforcing fiber when Compositions 1 and 2 are used as a matrix resin composition of a fiber-reinforced plastic.

An oxazolidone ring structure is produced according to an addition reaction between an isocyanate group and an epoxy group. Namely, according to a reaction between an isocyanate compound (Y) and an excess amount of an epoxy resin (X), the oxazolidone ring-containing epoxy resin (the component (A)) can be obtained. In the present invention, although various isocyanate compounds can be used, an isocyanate compound having plural isocyanate groups is preferable to have a bonding of an oxazolidone ring structure to a skeleton of an epoxy resin. Furthermore, diisocyanate with rigid structure is preferable to have high heat resistance of a cured product of the above Compositions 1 and 2.

Examples of the isocyanate compound (Y) include diisocyanates such as phenylene diisocyanate, tolylene diisocyanate, bis(isocyanatomehtyl)benzene, diphenylmethane diisocyanate, bis(isocyanatomehtyl)cyclohexane, or hexamehtylene diisocyanate. Among them, phenylene diisocyanate, toluylene diisocyanate, bis(isocyanatomehtyl)benzene, and diphenylmethane diisocyanate, which have a rigid structure by having a benzene ring in the skeleton, are preferable. Among them, from the viewpoint of ease of economic obtainability, toluylene diisocyanate and diphenylmethane diisocyanate are particularly preferable.

Furthermore, various epoxy resins can be used as the epoxy resin (X). However, for having an efficient bonding of the oxazolidone ring structure to the skeleton of an epoxy resin, an epoxy resin having epoxy groups at both ends of the molecule is preferable. Preferable examples include an epoxy resin such as a bisphenol A type epoxy resin, a bisphenol F type epoxy resin, or a biphenyl type epoxy resin. Among them, from the viewpoint of avoiding excessively high viscosity of the obtained oxazolidone ring-containing epoxy resin, that is, the component (A), bisphenol A diglycidyl ether, bisphenol F diglycidyl ether, and biphenyldiglycidyl ether are particularly preferable.

An addition product obtained by reacting one molecule of tolylene diisocyanate or diphenylmethane diisocyanate as the isocyanate compound (Y) and two molecules of bisphenol A diglycidyl ether as the epoxy resin (X) is particularly preferable in that it can provide good workability of a prepreg at room temperature and good heat resistance of a cured product.

Namely, as one embodiment of the present invention, the compound (A) is preferably an oxazolidone ring-containing epoxy resin which is obtained according to a reaction between the isocyanate compound (Y) and the epoxy resin (X).

Examples of a commercially available oxazolidone ring-containing epoxy resin (component (A)) include AER4152 and XAC4151 (all trade names, manufactured by Asahi Kasei E-materials Corporation), ACR1348 (trade name, manufactured by ADEKA Corporation), and DER852 and DER858 (all trade names, manufactured by DOW). They are all preferably used in the present invention.

As the component (A), the above listed epoxy resins may be used in combination of two or more types.

The content of the component (A) in Compositions 1 and 2 is preferably 30 parts by mass to 70 parts by mass relative to 100 parts by mass of the total amount of all epoxy resins that are contained in Compositions 1 and 2. When the amount of the component (A) is 30 parts by mass or more, Compositions 1 and 2 can have high heat resistance and high mechanical properties, and therefore preferable. Furthermore, as the 90° bending strength of the obtained fiber-reinforced plastic is improved when Compositions 1 and 2 are used as a matrix resin composition of a fiber-reinforced plastic, it is therefore desirable. Meanwhile, from the viewpoint of the resin bending elastic modulus, it is preferably 70 parts by mass or less. More preferably, it is 40 parts by mass to 70 parts by mass. It is even more preferably 40 parts by mass to 60 parts by mass. It is particularly preferably 50 parts by mass to 60 parts by mass.

"Component (B-1) glycidylamine type epoxy resin (with the proviso that, it does not have an oxazolidone ring)"

Composition 1 contains, as the component (B-1), a glycidylamine type epoxy resin (with the proviso that, it does not have an oxazolidone ring).

The glycidylamine type epoxy resin has an effect of increasing the resin bending elastic modulus of an epoxy resin composition containing it.

Specific examples of the glycidylamine type epoxy resin which is used as the component (B-1) in the present invention include tetraglycidyl diaminodiphenylmethane, glycidyl compounds of aminophenol and aminocresol, glycidylanilines, and glycidyl compounds of xylenediamine.

Examples of commercially available tetraglycidyl diaminodiphenylmethane include Sumiepoxy ELM434 (trade name, manufactured by Sumitomo Chemical Company, Limited), Araldite MY720, Araldite MY721, Araldite MY9512, Araldite MY9612, Araldite MY9634, Araldite MY9663 (all trade names, manufactured by Huntsman Advanced Materials), jER604 (trade name, manufactured by Mitsubishi Chemical Corporation), and Bakelite EPR494, Bakelite EPR495, "Bakelite EPR496, and Bakelite EPR497 (all trade names, manufactured by Bakelite AG).

Examples of commercially available glycidyl compounds of aminophenol or aminocresol include jER630 (trade name, manufactured by Mitsubishi Chemical Corporation), Araldite MY0500, Araldite MY0510, Araldite MY0600 (all trade names, manufactured by Huntsman Advanced Materials), and Sumiepoxy ELM120 and Sumiepoxy ELM100 (all trade names, manufactured by Sumitomo Chemical Company, Limited).

Examples of commercially available glycidylanilines include GAN, GOT (all trade names, manufactured by Nippon Kayaku Co., Ltd.) and Bakelite EPR493 (trade name, manufactured by Bakelite AG). Examples of glycidyl compounds of xylenediamine include TETRAD-X (trade name, manufactured BY MITSUBISHI GAS CHEMICAL COMPANY, INC.). In addition, as the component (B-1), these epoxy resins may be also used in combination of two or more types.

As for the component (B-1) to be contained in Composition 1, a compound having a cyclolakane or an aromatic ring structure in a molecular region other than glycidylamine structure is preferred in that it has high resin bending elastic modulus.

Furthermore, a glycidylamine type epoxy resin having relatively low molecular weight (for example, the number average molecular weight of 300 or less) is preferable in that it can increase the resin bending elastic modulus of an epoxy resin composition containing it, without lowering the resin bending strain at break. In particular, glycidylanilines (for example, glycidylaniline, N,N-diglycidyl-o-toluidine, or the like) are preferable in that the epoxy resin composition containing it can have high resin bending elastic modulus. Among them, N,N-diglycidyl-o-toluidine is preferable in that, even with a small amount, it can increase the resin bending elastic modulus of an epoxy resin composition containing it.

In general, the epoxy resin capable of giving high elastic modulus to a cured resin product often lowers resin bending strain at break. However, from the viewpoint that N,N-diglycidyl-o-toluidine hardly lowers the resin bending strain at break, it is also preferable.

The component (B-1) to be contained in Composition 1 is advantageous in that it can increase the resin bending elastic modulus. However, if the content is excessively high, it has a tendency of lowering the adhesiveness between a cured resin product and a reinforcing fiber and lowering 90° bending strength of a fiber-reinforced plastic. On the other hand, the component (A) has an effect of enhancing the adhesiveness between a cured resin product and a reinforcing fiber, but it has a tendency of suppressing an improvement of the resin bending elastic modulus. In order to have the adhesiveness and resin bending elastic modulus both at high level, the component (A): the component (B-1) is, in terms of mass ratio, preferably 60:40 to 99:1, and more preferably 70:30 to 95:5.

Furthermore, the amount of the component (B-1) to be contained in Composition 1 is preferably 1 part by mass to 30 parts by mass relative to 100 parts by mass of the total amount of all epoxy resins contained in Composition 1. If the amount of the compound (B-1) is 1 part by mass or more, high resin bending elastic modulus is obtained, and thus preferable. On the other hand, from the viewpoint of the resin bending strain at break, it is preferably 30 parts by mass or less. It is particularly preferably 3 to 10 parts by mass.

"Component (B-2): Glycidylphthalimide"

Composition 2 described above contains glycidylphthalimide as the component (B-2).

Glycidylphthalimide has an effect of increasing the resin bending elastic modulus of an epoxy resin composition containing it. Meanwhile, glycidylphthalimide described in the present invention means N-glycidylphthalimide.

Examples of commercially available glycidylphthalimide include Denacol EX-731 (trade name, manufactured by Nagase ChemteX Corporation).

The component (B-2) to be contained in Composition 2 is advantageous in that it can increase the resin bending elastic modulus. However, if the content is excessively high, it has a tendency of lowering the adhesiveness between a cured resin product and a reinforcing fiber and lowering 90° bending strength of a fiber-reinforced plastic. On the other hand, the component (A) has an effect of enhancing the adhesiveness between a cured resin product and a reinforcing fiber, but it has a tendency of suppressing an improvement of the resin bending elastic modulus. In order to have the adhesiveness and resin bending elastic modulus both at high level, the component (A): the component (B-2) is, in terms of mass ratio, preferably 70:30 to 97:3, and more preferably 80:20 to 95:5 Meanwhile, in spite of relatively low molecular weight, glycidylphthalimide has low volatility, which is preferable in terms of handlability of Composition 2 containing it.

Furthermore, the amount of the component (B-2) to be contained in Composition 2 is preferably 1 part by mass to 15 parts by mass relative to 100 parts by mass of the total amount of all epoxy resins contained in Composition 2. If the amount of the compound (B-2) is 1 part by mass or more, high resin bending elastic modulus is obtained, and thus preferable. On the other hand, from the viewpoint of the resin bending strain at break, it is preferably 15 parts by mass or less. It is more preferably 3 to 10 parts by mass. It is even more preferably 3 to 6 parts by mass.

Furthermore, in the present invention, the component (B-1) and the component (B-2) may be used in combination. Namely, the composition of the present invention may contain, as the component (B), at least one type selected from a group consisting of the component (B-1) and the component (B-2). When the component (B-1) and the component (B-2) are used in combination, the total amount of the component (B-1) and the component (B-2) is preferably 1 part by mass to 30 parts by mass, and more preferably 1 part by mass to 15 parts by mass relative to 100 parts by mass of the total amount of the epoxy resin contained in the epoxy resin composition. Meanwhile, for the composition containing both the component (B-1) and the component (B-2), the same descriptions as those for Composition 1 and Composition 2 are applied, unless specifically described otherwise.

"(C) Bisphenol type bifunctional epoxy resin having the number average molecular weight of 600 or more (with the proviso that, it does not have an oxazolidone ring and is not a glycidylamine type epoxy resin)"

The above Compositions 1 and 2 contain, as the component (C), a bisphenol type bifunctional epoxy resin having the number average molecular weight of 600 or more which does not have an oxazolidone ring in the molecule and is not a glycidylamine type epoxy resin. The expressions "it does not have an oxazolidone ring" and "is not a glycidylamine type epoxy resin" herein are the same as described above.

Meanwhile, the "bifunctional epoxy resin" indicates a compound having two epoxy groups in the molecule. The same applies to a "trifunctional epoxy resin" or the like that are described below.

The bisphenol type bifunctional epoxy resin having the number average molecular weight of 600 or more has an effect of increasing the resin bending strain at break of an epoxy resin composition containing it.

Examples of the epoxy resin to be used as the component (C) include a bisphenol A type epoxy resin and a bisphenol F type epoxy resin, but not limited thereto. Furthermore, as the component (C), the epoxy resin may be used in combination of two or more types.

As the component (C) is contained as a bifunctional epoxy resin in Compositions 1 and 2, high fracture toughness is obtained for a fiber-reinforced plastic using it. Namely, compared to a case in which an epoxy resin with functionality of 3 or higher is used, fracture toughness of a fiber-reinforced plastic is higher, and heat resistance of a cured product is increased compared to a case in which a monofunctional epoxy resin is used.

As the number average molecular weight of the component (C) is 600 or more, higher resin bending strain at break is obtained, and therefore preferable. It is more preferably 800 or more. Meanwhile, although there is no upper limit for the number average molecular weight, from the viewpoint of heat resistance and resin bending elastic modulus of a cured resin product, the number average molecular weight is preferably 2000 or less, and more preferably 1300 or less.

Examples of commercially available bisphenol A type epoxy resin which is preferably used as the component (C) include jER1001, jER1002, jER1055, jER1004, jER4004P (all trade names, manufactured by Mitsubishi Chemical Corporation). Examples of commercially available bisphenol F type epoxy resin include YDF-2001 (trade name, manufactured by NIPPON STEEL & SUMIKIN CHEMICAL CO., LTD.), and jER4004P (trade name, manufactured by Mitsubishi Chemical Corporation). Meanwhile, from the viewpoint of having high resin bending elastic modulus, the bisphenol F type epoxy resin is preferable.

Furthermore, the amount of the component (C) to be contained in Compositions 1 and 2 is preferably 5 parts by mass or more and 30 parts by mass relative to 100 parts by mass of the total amount of all epoxy resins contained in Compositions 1 and 2. If the amount of the compound (C) is 5 parts by mass or more, high resin bending strain at break is obtained, and thus preferable. On the other hand, from the viewpoint of the resin bending elastic modulus, it is preferably 30 parts by mass or less. It is particularly preferably 10 to 20 parts by mass.

"Component (D) Phenoxy Resin"

The above Compositions 1 and 2 contain a phenoxy resin as the component (D).

In general, when a thermoplastic resin is contained in the epoxy resin composition, the resin bending strain at break of the composition is generally increased. On the other hand, the resin bending elastic modulus is lowered. However, the phenoxy resin has an effect of increasing the resin bending strain at break without lowering the resin bending elastic modulus.

Examples of the phenoxy resin which is used as the component (D) include a bisphenol A type phenoxy resin, a bisphenol F type phenoxy resin, and a phenoxy resin in which bisphenol A type and bisphenol F type are mixedly present, but not limited thereto. Furthermore, as the component (D), the phenoxy resin may be used in combination of two or more types.

From the viewpoint of controlling the viscosity of Compositions 1 and 2 to a suitable viscosity range, the weight average molecular weight of the phenoxy resin as the component (D) is preferably 50000 to 80000. That is, when the weight average molecular weight of the phenoxy resin is 50000 or more, viscosity of Compositions 1 and 2 can be adjusted to a suitable viscosity range with a suitable blending amount. On the other hand, when the weight average molecular weight is 80000 or less, dissolution into an epoxy resin can be achieved so that viscosity of Compositions 1 and 2 can be adjusted to a suitable viscosity range even with an extremely small blending amount while having no excessively increased viscosity. The weight average molecular weight of the phenoxy resin is more preferably 50000 to 70000.

Specific examples of the phenoxy resin include YP-50, YP-50S, YP-70 (trade name, all of these are manufactured by NIPPON STEEL & SUMIKIN CHEMICAL CO., LTD.), and jER1256, jER4250, jER4275 (trade name, manufactured by Mitsubishi Chemical Corporation).

The amount of the component (D) to be contained in Compositions 1 and 2 is preferably 1 part by mass or more and 15 parts by mass or less relative to 100 parts by mass of the total amount of all epoxy resins contained in Compositions 1 and 2. If the amount is 1 part by mass or more, high resin bending strain at break of the epoxy resin composition containing it is obtained, and thus preferable. On the other hand, when it is 15 parts by mass or less, the epoxy resin composition can have high bending elastic modulus, and therefore preferable. It is particularly preferably 4 to 10 parts by mass.

"Component (E) Curing Agent"

The above Compositions 1 and 2 contain a curing agent as the component (E).

Type of the curing agent is not particularly limited, and examples thereof include amine-based curing agents, imidazoles, acid anhydrides, and boron chloride amine complexes. In particular, using dicyandiamide is preferable because properties of the epoxy resin composition will not be affected by humidity in the air and it can be kept stable for a long period of time, and curing can be completed at a relatively low temperature (for example, 100 to 130° C. or so).

The content of the component (E) in Compositions 1 and 2 varies depending on the type of component (E). For example, when the component (E) is dicyandiamide, its content is usually 1 part by mass or more and 25 parts by mass or less relative to 100 parts by mass of the all epoxy resins in the epoxy resin composition. More preferably, the molar number of active hydrogen of the dicyandiamide is preferably 0.6 to 1.0 times the total molar number of epoxy groups in the all epoxy resins contained in Compositions 1 and 2, because a cured product of the epoxy resin composition with good mechanical properties can be obtained. It is further preferable to have 0.6 to 0.8 times, because a cured product with even higher heat resistance can be obtained.

Meanwhile, the total molar number of epoxy groups in the epoxy resins contained in an epoxy resin composition can be calculated from the injection amount.

"Component (F) Urea Type Curing"

The above Compositions 1 and 2 may additionally contain a urea type curing aid as the component (F).

In particular, when dicyandiamide is used as the component (E) and the component (F) urea type curing aid is used in combination, the epoxy resin composition can be cured in a short period of time even at a low temperature, and therefore preferable.

Examples of the urea type curing aid include urea derivative compounds such as 3-phenyl-1,1-dimethylurea (PDMU), toluene bis dimethyl urea (TBDMU), and 3-(3,4-dichlorophenyl)-1,1-dimethylurea (DCMU), but not limited thereto. The urea type curing aid may be used either singly or in combination of two or more types. Among those, 3-phenyl-1,1-dimethylurea and toluene bis dimethyl urea are particularly preferable from the viewpoint of having heat resistance of a cured resin product and bending strength of a resin.

The blending amount of the component (F) is preferably 1.0 part by mass or more and 5.0 parts by mass or less relative to 100 parts by mass of the total amount of the epoxy resin contained in Compositions 1 and 2. It is particularly preferably 1.5 to 4.0 parts by mass.

"Component (G) low viscosity epoxy resin (with the proviso that, it does not have an oxazolidone ring and it is neither a glycidylamine type epoxy resin nor glycidylphthalimide)"

The above Compositions 1 and 2 may contain, as the component (G), low viscosity epoxy resin (with the proviso that, it does not have an oxazolidone ring and it is neither a glycidylamine type epoxy resin nor glycidylphthalimide, the same is applied below). The low viscosity epoxy resin indicates an epoxy resin which has a viscosity of 1000 Pa·s or lower at 30° C. The expressions "it does not have an oxazolidone ring" and "it is not a glycidylamine type epoxy resin" herein are as described above.

The viscosity at 30° C. is measured as follows. First, after increasing the temperature of the component (G) to 30° C. at a rate of 1 Hz and a 2° C./min, by using a rheometer (rotary dynamic viscoelasticity measuring device) such as DSR-200 (manufactured by Rheometrics, Inc.), visco analyzer VAR 100 (manufactured by Rheologica Instruments), viscosity at 30° C. is measured.

By using a low viscosity epoxy resin, the viscosity of Compositions 1 and 2 can be easily controlled to a suitable range, and tackiness of a prepreg containing Composition 1 or 2 can be controlled to a suitable range. Furthermore, a molded product of a fiber-reinforced plastic with less void can be obtained.

Examples of the component (G) include bisphenol A epoxy resins, bisphenol F epoxy resins, biphenyl epoxy resins, dicyclopentadiene epoxy resins, phenol novolac epoxy resins, cresol novolac epoxy resins, and glycidyl phenyl ether epoxy resins. In addition, epoxy resins obtained by modifying those epoxy resins, brominated epoxy resins obtained by brominating those epoxy resins and so on are also included, but not limited thereto. Furthermore, the epoxy resin may be used in combination of two or more types as the component (G).

As a bisphenol bifunctional epoxy resin is contained as the component (G), Compositions 1 and 2 exhibit no abrupt viscosity increase even at curing temperature. In addition, an occurrence of voids is suppressed in a cured resin product, and a cured product exhibits high heat tolerance, and therefore more preferable. The bisphenol F type epoxy resin is particularly preferable in that it has also excellent resin bending elastic modulus.

The amount of the component (G) in Compositions 1 and 2 is preferably 50 parts by mass or less relative to 100 parts by mass of the total amount of all epoxy resins contained in Compositions 1 and 2. From the viewpoint of the workability, resin bending elastic modulus, and resin bending strain at break of a prepreg containing the component (G), it is preferably 50 parts by mass or less. It is particularly preferably 5 to 40 parts by mass.

"Other Epoxy Resin"

Each of the above Compositions 1 and 2 may contain, within a range that the effect of the present invention is not negatively affected, an epoxy resin which does not correspond to any one of the component (A), the component (B-1), the component (B-2), the component (C), and the component (G) (hereinbelow, it is referred to as the "other epoxy resin").

Examples of the other epoxy resin include, as a bifunctional epoxy resin, bisphenol A epoxy resins, bisphenol F epoxy resins, biphenyl epoxy resins, dicyclopentadiene epoxy resins, and epoxy resins obtained by modifying them. Examples of a polyfunctional epoxy resin with functionality of 3 or higher include phenol novolac epoxy resins, cresol novolac epoxy resins, and glydicylphenyl ether type epoxy resins such as triaglycidyl aminophenol, tetrakis (glycidyloxyphenyl)ethane or tris (glycidyloxyphenyl)methane. In addition, epoxy resins obtained by modifying those epoxy resins, brominated epoxy resins obtained by brominating those epoxy resins and so on are also included, but not limited thereto. Furthermore, the epoxy resin may be used in combination of two or more types and used as other epoxy resin.

In order to have full exhibition of the aforementioned effect of the present invention, the amount of the "other epoxy resin" to be contained in Compositions 1 and 2 is preferably 25 parts by mass or less relative to 100 parts by mass of the total amount of all epoxy resins contained in Compositions 1 and 2.

In particular, in the above Composition 1, the total amount of the components (A), (B-1), (C), and (G) in the epoxy resin composition containing the components (A), (B-1), (C), (D), (E), and (G) is preferably 75 parts by mass or more relative to 100 parts by mass of the total amount of epoxy resin contained in the epoxy resin composition. In the above Composition 2, the total amount of the components (A), (B-2), (C), and (G) in the epoxy resin composition containing the components (A), (B-2), (C), (D), (E), and (G) is preferably 75 parts by mass or more relative to 100 parts by mass of the total amount of epoxy resin contained in the epoxy resin composition.

"Other Additives"

The above Compositions 1 and 2 may contain, within a range that the effect of the present invention is not negatively affected, at least one additive selected from a group consisting of a thermoplastic resin other than the component (D) phenoxy resin described above, a thermoplastic elastomer, and an elastomer.

The additives not only play a role of optimizing viscosity, storage elasticity and thixotropic properties of Compositions 1 and 2 by modifying their visco-elasticity but also work to improve the toughness of the cured products of Compositions 1 and 2.

The thermoplastic resin, elastomer, and thermoplastic elastomer to be used as an additive may be used either singly or in combination of two or more types. Such an additive may be dissolved and blended in epoxy resin components, or may be contained in the epoxy resin composition in a state of fine particles, long fiber, short fiber, fabric, nonwoven cloth, mesh, pulp or the like. When the additive is provided on the surface layer of a prepreg in a state of fine particles, long fiber, short fiber, fabric, nonwoven cloth, mesh, pulp or the like, interlayer delamination of a fiber-reinforced plastic is suppressed, and therefore preferable.

As for thermoplastic resin, it is preferred to use a thermoplastic resin that contains in its main chain a bonding selected from a group of carbon-carbon bonding, amide bonding, imide bonding, ester bonding, ether bonding, carbonate bonding, urethane bonding, urea bonding, thioether bonding, sulfonic bonding, imidazole bonding, and carbonyl bonding. More preferred examples are thermoplastic resins that belong to engineering plastics such as polyacrylate, polyamide, polyaramid, polyester, polycarbonate, polyphenylene sulfide, polybenzimidazole, polyimide, polyether imide, polysulfone, or polyether sulfone. From the viewpoint of having excellent heat resistance, polyimide, polyether imide, polysulfone, and polyether sulfone or the like are particularly preferably used.

Furthermore, having a functional group capable of reacting with epoxy resin in the thermoplastic resin is preferable from the viewpoint of increasing the toughness and maintaining environmental resistance of the cured products of Compositions 1 and 2. Examples of the functional group capable of reacting with an epoxy resin include a carboxy group, an amino group, and a hydroxyl group.

[Use]

By coating the epoxy resin composition of the present invention on release paper or the like, it can be provided as a film. As an intermediate material for producing a prepreg, the film of the present invention can be laminated on a substrate and cured, and then it can be advantageously used for a surface protecting film or an adhesive film.

By impregnating a reinforcing fiber substrate in the epoxy resin composition of the present invention, a prepreg can be obtained. The reinforcing fiber is not particularly limited, and examples thereof which can be used include carbon fibers, graphite fibers, glass fibers, organic fibers, boron fibers, and steel fibers.

As reinforcing fibers constituting the reinforcing fiber substrate, carbon fibers and graphite fibers can be preferably used in the prepreg of the present invention since they have an excellent specific elastic modulus and contribute significantly to have light weight. Also, any kind of carbon fibers and graphite fibers can be used for depending on use.

Examples of the reinforcing fiber substrate include those in which the reinforcing fibers are in a state of tow, cloth, or chopped fiber, continuous fibers evenly aligned to have a unidirectional orientation, continuous fibers woven to have vertical and horizontal orientations, tows in a unidirectional alignment and held by a horizontal auxiliary yarn, multiple unidirectional reinforcing fiber sheets laminated in different directions and stitched with an auxiliary yarn so as to form multiaxial warp knit, non-woven reinforcing fibers, and the like.

Fiber-reinforced plastics containing a cured product of the epoxy resin composition and reinforcing fibers can be obtained by applying and curing the prepreg of the present invention. Use of fiber-reinforced plastics is not particularly limited, and for example, they can be used in general industrial applications such as aircraft structural material, automobiles, ships, sports equipment, windmills, rolls and the like.

Among them, as the tubular body consisting of the fiber-reinforced plastic of the present invention has very high fracture strength, it can be particularly preferably used for use in sports and leisure like golf shaft.

As for the method for producing a fiber-reinforced plastic, examples thereof include autoclave molding, press molding, internal-pressurizing molding, oven molding, sheet wrap molding or the like which use the aforementioned prepreg of the present invention, and also RTM (resin transfer molding), VaRTM (vacuum assisted resin transfer molding), filament winding, RFI (resin film infusion) or the like in which the aforementioned epoxy resin composition of the present invention is impregnated in a tow or a preform of reinforcing fibers followed by curing to provide a molded product. Meanwhile, for producing the aforementioned tubular body, sheet wrap molding, internal-pressurizing molding, or the like is generally used, but it is not limited to those molding methods.

EXAMPLES

Hereinbelow, the present invention is described specifically in view of the examples.

However, it is evident the present invention is not limited to those examples.

<Raw Materials>

Component (A):

AER4152 (trade name): bifunctional epoxy resin having an oxazolidone ring in the skeleton, the number average molecular weight of 814, manufactured by Asahi Kasei E-materials Corporation.

DER858 (trade name: "DER858"): bifunctional epoxy resin having an oxazolidone ring in the skeleton, manufactured by The DOW Chemical Company Component (B-1):

jER604 (trade name): glycidylamine type tetrafunctional epoxy resin, tetraglycidyl diaminodimehtylmethane, manufactured by Mitsubishi Chemical Corporation jER630 (trade name): glycidylamine type trifunctional epoxy resin: N,N-bis(2,3-epoxypropyl)-4-(2,3-epoxypropoxy)aniline, manufactured by Mitsubishi Chemical Corporation GAN (trade name): diglycidylaniline, manufactured by Nippon Kayaku Co., Ltd.

GOT (trade name): N,N-diglycidyl-o-toluidine, manufactured by Nippon Kayaku Co., Ltd.

Component (B-2)

EX731: trade name of "Deconal EX-731", N-glycidylphthalimide, manufactured by Nagase ChemteX Corporation Component (C):

jER1001 (trade name): bisphenol A type bifunctional epoxy resin, epoxy equivalents of 450 to 500 g/eq, the number average molecular weight of 900, manufactured by Mitsubishi Chemical Corporation jER1002 (trade name): bisphenol A type bifunctional epoxy resin, epoxy equivalents of 600 to 700 g/eq, the number average molecular weight of 1200, manufactured by Mitsubishi Chemical Corporation jER1055 (trade name): bisphenol A type bifunctional epoxy resin, epoxy equivalents of 850 g/eq, the number average molecular weight of 1600, manufactured by Mitsubishi Chemical Corporation Component (D):

YP-70 (trade name): bisphenol A/bisphenol F copolymer type phenoxy resin, weight average molecular weight of 50,000 to 60,000, manufactured by NIPPON STEEL & SUMIKIN CHEMICAL CO., LTD.

YP-50S (trade name): phenoxy resin, weight average molecular weight of 50,000 to 70,000 manufactured by NIPPON STEEL & SUMIKIN CHEMICAL CO., LTD.

Component (E):

DICY15 (trade name): dicyanamide, manufactured by Mitsubishi Chemical Corporation Component (F):

DCMU99 (trade name): 3-(3,4-dichlorophenyl)-1,1-dimehtylurea, manufactured by PTI JAPAN LTD.

Component (G):

jER828 (trade name): bisphenol A type bifunctional epoxy resin, epoxy equivalents of 189 g/eq, manufactured by Mitsubishi Chemical Corporation jER807 (trade name): bisphenol F type bifunctional epoxy resin, epoxy equivalents of 167 g/eq, manufactured by Mitsubishi Chemical Corporation Other epoxy resin:

N775 (trade name): phenol novolac type polyfunctional epoxy resin, epoxy equivalents of 190 g/eq, manufactured by DIC CORPORATION MX-113 (trade name: "Kane Ace MX-113"): bisphenol A type the epoxy resin (bifunctional epoxy resin. Epoxy equivalents: 189 g/eq): 66% by mass, and butadiene based type core-shell type rubber particles (volume average particle diameter of 100 nm): 33% by mass, manufactured by KANEKA CORPORATION Other Components:

Thermoplastic Resin:

Vinylec E (trade name): polyvinyl formal, manufactured by CHISSO CORPORATION

TPAE32 (trade name): polyether ester amide, manufactured by T&K TOKA., LTD

Nanostrength 52 (trade name): triblock copolymer of acrylic block copolymer (poly(mehtylmethacrylateypoly (butyl acrylate)/poly(methylmethacrylate), manufactured by Arkema Examples 1 to 11 and Comparative Examples 1 to 9

An epoxy resin composition was produced in the following order, and the resin bending elastic modulus, resin bending strain at break, and tensile lap-shear strength were measured. The resin composition and results of the measurement (evaluation) are shown in Table 1 and Table 2.

<Preparation of Catalyst Resin Composition 1>

Among the resin compositions of each Example and Comparative Example shown in Table 1 and Table 2, the component (E) and the component (F) shown in the same tables were homogeneously dispersed in part of jER828 by using a three-roll mill to prepare the catalyst resin composition 1.

<Preparation of Epoxy Resin Composition 1>

Among the resin compositions of Table 1 and Table 2, the component (D) from raw materials of each Example and Comparative Example and, among other components, part of the components having relatively low viscosity were heated and mixed at 150° C. to obtain a homogeneous master batch (1).

Next, into the master batch (1) that was cooled to 120° C. or lower, part of the remaining raw materials of each Example and Comparative Example was added. After heating and mixing at 120° C. followed by homogeneous dispersing, a master batch (2) was obtained.

The master batch (2) obtained from above was cooled to 60° C. or lower, and then added with the catalyst resin composition 1, which has been prepared in advance, and all the remaining raw materials, heated and mixed at 60° C., and uniformly dispersed to obtain the epoxy resin composition 1.

Examples 12 to 20 and Comparative Examples 10 and 11

An epoxy resin composition was produced in the following order, and the resin bending elastic modulus, resin bending strain at break, and tensile lap-shear strength were measured by using it. The resin composition and results of the measurement (evaluation) are shown in Table 3.

<Preparation of Catalyst Resin Composition 2>

In part of the liquid phase epoxy resin components to be contained in the resin compositions of each Example and Comparative Example shown in Table 3, the component (E) and the component (F) shown in the same tables were homogeneously dispersed by using a three-roll mill to prepare the catalyst resin composition 2.

<Preparation of Epoxy Resin Composition 2>

Part of solid phase epoxy resin component to be contained in the resin compositions of each Example and Comparative Example shown in Table 3, part of the remaining liquid phase epoxy resin components, and the component (D) were heated and mixed at 150° C. to obtain a homogeneous master batch (1).

Next, into the master batch (1) that was cooled to 120° C., the remaining solid phase epoxy resin components was added. After heating and mixing at 120° C. followed by homogeneous dispersing, a master batch (2) was obtained.

The master batch (2) obtained from above was cooled to 60° C., and then added with the catalyst resin composition which has been prepared in advance and the remaining liquid phase epoxy resin components, heated and mixed at 60° C., and uniformly dispersed to obtain the epoxy resin composition 2.

<Preparation of Cured Resin Plate>

Each of the epoxy resin composition prepared according to above <Preparation of epoxy resin composition 1> and <Preparation of epoxy resin composition 2> was sandwiched between glass plates with a 2 mm thick spacer made of polytetrafluoroethylene. Then, the temperature was raised at temperature increase rate of 2° C./min, and the composition was cured by maintaining the temperature at 130° C. for 90 minutes. Accordingly, a cured resin plate was obtained.

<Measurement of Resin Bending Elastic Modulus and Resin Bending Strain at Break>

Each of 2 mm thick cured resin plates prepared in the aforementioned <Preparation of cured resin plate> was processed into a test piece (60 mm long×8 mm wide). Then, measurement was carried out by using INSTRON 4465 tester equipped with a 500 N load cell and using a three-point bending jig (load applicator R=3.2 mm, support R=1.6 mm) under conditions of temperature at 23° C. and humidity of 50% RH. At that time, distance (L) between supports of a jig and thickness (d) of the test piece are set at a ratio (L/d) of 16 and the test piece was bent to measure elastic modulus, strain under maximum load, and strain at break.

Meanwhile, if the test piece is not broken by the resin bending test, the device is stopped when the strain is more than 13%, and the value at that moment is taken as strain at break. The results are shown in Table 1 to Table 3.

<Method for Tensile Lap-Shear Strength Test (Lap-shear Test)>

Based on JIS K 6850 "Method for testing tensile lap-shear strength of adhesive-rigid body for adhesion", tensile lap-shear strength was measured.

On a test piece (A5052 aluminum processed to have length of 100 mm×width of 25 mm×thickness of 0.1 mm), the epoxy resin composition obtained in the aforementioned <Preparation of epoxy resin composition 1> was coated so as to have an adhesion region with length of 6.3 mm×width of 25 mm×thickness of 0.1 mm. To have 0.1 mm thickness of the epoxy resin composition, several glass beads with a size of 0.1 mm were placed on top of the coated epoxy resin composition to have a spacer. On a surface of the test piece coated with the epoxy resin composition, a test piece not coated with the epoxy resin composition was additionally laminated. By increasing the temperature at temperature increase rate of 2° C./min in an oven followed by maintaining them at 130° C. for 90 minutes, a tensile test piece was obtained.

Subsequently, by using INSTRON 5565 tester equipped with 5 kN load cell and, after holding both ends of the tensile test piece by a chuck in an environment with temperature of 23° C. and humidity of 50% RH, the test piece was pulled at test rate of 1 mm/sec to break it. Surface after the break was confirmed to be an interface delamination. From the test piece after the break, the resin area was measured. From the calculated ratio of maximum load value at break/resin area value, tensile lap-shear strength was calculated. The results are shown in Table 1 to Table 3.

TABLE 1

| | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Component (A) | AER4152 | 49 | 46 | 47 | 49 | 52 | 45 | 44 | 33 | 45 | 43 | 44 |
| Component (B-1) | jER604 | 0 | 0 | 0 | 0 | 0 | 0 | 0 | 0 | 0 | 0 | 26 |
| | jER630 | 0 | 0 | 0 | 0 | 0 | 0 | 0 | 0 | 0 | 26 | 0 |
| | GAN | 0 | 0 | 0 | 0 | 0 | 13 | 0 | 25 | 18 | 0 | 0 |
| | GOT | 9 | 9 | 9 | 7 | 4 | 0 | 9 | 0 | 0 | 0 | 0 |
| Component (C) | jER1002 | 13 | 14 | 14 | 13 | 14 | 0 | 13 | 0 | 0 | 0 | 0 |
| | jER1055 | 0 | 0 | 0 | 0 | 0 | 18 | 0 | 17 | 27 | 17 | 17 |
| Component (D) | YP70 | 4 | 6 | 6 | 4 | 5 | 9 | 4 | 5 | 5 | 9 | 9 |
| Component (E) | Dicy15 | 6 | 6 | 6 | 6 | 6 | 5 | 6 | 6 | 5 | 7 | 6 |
| Component (F) | DCMU99 | 4 | 4 | 4 | 4 | 4 | 3 | 4 | 4 | 3 | 5 | 4 |
| Component (G) | jER828 | 12 | 12 | 11 | 12 | 12 | 10 | 11 | 26 | 9 | 14 | 13 |
| | jER807 | 18 | 19 | 19 | 18 | 19 | 13 | 22 | 0 | 0 | 0 | 0 |
| Other epoxy resins | jER154 | 0 | 10 | 0 | 0 | 0 | 0 | 0 | 0 | 0 | 0 | 0 |
| | N775 | 0 | 10 | 0 | 0 | 0 | 0 | 0 | 0 | 0 | 0 | 0 |
| Other components | Vinylec E | 0 | 0 | 0 | 0 | 0 | 0 | 0 | 2 | 0 | 0 | 0 |
| Resin bending | Strength (MPa) | 167 | 159 | 160 | 161 | 161 | 162 | 170 | 163 | 166 | 170 | 169 |
| | Elastic modulus (GPa) | 3.5 | 3.5 | 3.4 | 3.4 | 3.4 | 3.4 | 3.6 | 3.7 | 3.5 | 3.3 | 3.3 |
| | Strain at break (%) | 13 | 13 | 15 | 12 | 12 | 11 | 11 | 9 | 10 | 11 | 9 |
| Lap shear | Strength (MPa) | 10.9 | 10.9 | 10.2 | 10.4 | 11.0 | — | 11.5 | 10.3 | — | — | — |

TABLE 2

| | | Comparative Example 1 | Comparative Example 2 | Comparative Example 3 | Comparative Example. 4 | Comparative Example 5 | Comparative Example 6 | Comparative Example 7 | Comparative Example 8 | Comparative Example 9 |
|---|---|---|---|---|---|---|---|---|---|---|
| Component (A) | AER4152 | 44 | 50 | 34 | 43 | 54 | 54 | 49 | 49 | 49 |
| Component (B-1) | jER604 | 0 | 0 | 0 | 0 | 0 | 0 | 0 | 0 | 0 |
| | jER630 | 0 | 0 | 0 | 0 | 0 | 0 | 0 | 0 | 0 |
| | GAN | 0 | 0 | 0 | 26 | 0 | 0 | 0 | 0 | 0 |
| | GOT | 0 | 0 | 17 | 0 | 0 | 0 | 9 | 9 | 9 |
| Component (C) | jER1002 | 8 | 0 | 0 | 0 | 0 | 0 | 13 | 13 | 13 |
| | jER1055 | 0 | 0 | 0 | 0 | 13 | 18 | 0 | 0 | 0 |
| Component (D) | YP70 | 0 | 0 | 9 | 9 | 4 | 9 | 0 | 0 | 0 |
| Component (E) | Dicy15 | 5 | 8 | 7 | 7 | 5 | 5 | 6 | 6 | 6 |
| Component (F) | DCMU99 | 4 | 5 | 5 | 5 | 4 | 4 | 4 | 4 | 4 |
| Component (G) | jER828 | 46 | 15 | 15 | 14 | 11 | 11 | 12 | 12 | 12 |
| | jER807 | 0 | 30 | 0 | 0 | 22 | 0 | 18 | 18 | 18 |
| Other epoxy resins | jER154 | 0 | 0 | 0 | 0 | 0 | 18 | 0 | 0 | 0 |
| | N775 | 0 | 20 | 34 | 17 | 0 | 0 | 0 | 0 | 0 |
| Other components | Vinylec E | 3 | 5 | 0 | 0 | 0 | 0 | 4 | 0 | 0 |
| | TPAE32 | 0 | 0 | 0 | 0 | 0 | 0 | 0 | 4 | 0 |
| | Nanostrength M52N | 0 | 0 | 0 | 0 | 0 | 0 | 0 | 0 | 4 |

TABLE 2-continued

|  |  | Comparative Example 1 | Comparative Example 2 | Comparative Example 3 | Comparative Example. 4 | Comparative Example 5 | Comparative Example 6 | Comparative Example 7 | Comparative Example 8 | Comparative Example 9 |
|---|---|---|---|---|---|---|---|---|---|---|
| Resin bending | Strength (MPa) | 150 | 173 | 101 | 141 | 151 | 149 | 122 | 127 | 140 |
|  | Elastic modulus (GPa) | 3.1 | 3.6 | 4.1 | 3.9 | 3.2 | 3.2 | 3.6 | 3.0 | 3.0 |
|  | Strain at break (%) | 13 | 8 | 3 | 4 | 9 | 6 | 3.7 | 8.0 | 13.0 |

TABLE 3

|  |  | Example 12 | Example 13 | Example 14 | Example 15 | Example 16 | Example 17 | Example 18 | Example 19 | Example 20 | Comparative Example 10 | Comparative Example 11 |
|---|---|---|---|---|---|---|---|---|---|---|---|---|
| Component (A) | AER4152 | 50 | 50 | 50 | 50 | — | 50 | 50 | 45 | 30 | 50 | 60 |
|  | DER858 | — | — | — | — | 50 | — | — | — | — | — | — |
| Component (B-2) | EX731 | 5 | 5 | 5 | 5 | 5 | 5 | 10 | 10 | 10 | — | — |
| Component (C) | jER1001 | — | — | — | 15 | — | — | — | — | — | — | — |
|  | jER1002 | 15 | 15 | 15 | — | 15 | 15 | 15 | 20 | 25 | 20 | 15 |
| Component (D) | YP50S | — | — | 5 | — | — | — | — | — | — | — | — |
|  | YP70 | 6 | 6 | — | 6 | 6 | 7 | 5 | 5 | 5 | 10 | 5 |
| Component (E) | Dicy15 | 6 | 6 | 6 | 6 | 6 | 6 | 6 | 6 | 6 | 7 | 6 |
| Component (F) | DCMU99 | 4 | 4 | 4 | 4 | 4 | 4 | 4 | 4 | 4 | 5 | 4 |
| Others | jER828 | 12 | 37 | 0 | 12 | 12 | 0 | 12 | 12 | 12 | 14 | 12 |
|  | jER807 | 25 | 0 | 37 | 25 | 25 | 37 | 25 | 25 | 25 | 10 | 25 |
|  | N775 | — | — | — | — | — | — | — | — | — | 20 | — |
| Resin bending | Bending strength (MPa) | 164 | 151 | 163 | 162 | 159 | 158 | 169 | 160 | 163 | 162 | 157 |
|  | Elastic modulus (GPa) | 3.7 | 3.4 | 3.5 | 3.4 | 3.4 | 3.4 | 3.6 | 3.5 | 3.7 | 3.4 | 3.2 |
|  | Strain at break (%) | 13 | 13 | 9 | 12 | 12 | 13 | 11 | 9 | 9 | 8 | 13 |

Examples 21 to 23 and Comparative Examples 12 and 13

An epoxy resin composition was prepared in the same manner as Example 1 except that the raw materials described in Table 4 were used. Accordingly, a cured resin plate was produced. By using the obtained cured resin plate, the resin bending elastic modulus, the resin bending strain at break, and the tensile lap-shear strength were measured in the same manner as Example 1. The results are shown in Table 4.

Furthermore, by using the method described below, a fiber-reinforced plastic panel was produced, and the bending strength of the fiber-reinforced plastic was measured by using it. The results are shown in Table 4.

<Method for Producing Fiber-reinforced Plastic Panel>

An epoxy resin composition was prepared in the same manner as Example 1 except that the raw materials described in Table 4 were used. The obtained epoxy resin composition was heated to 60° C. and was coated using a film coater on a release paper, thereby a resin film was produced. Thickness of the resin film was set such that the prepreg resin content was 28% by mass in a case in which a prepreg was produced by using two pieces of the resin films as described below.

On the resin film (release paper surface on which resin film is formed), carbon fibers (HR 40, manufactured by Mitsubishi Rayon Co., Ltd.) were wound using a drum winding device to have a sheet with fiber weight per unit area of 125 g/m². Furthermore, one additional resin film was laminated on top of the carbon fiber sheet using a drum winding device. The carbon fiber sheet sandwiched between two resin films was passed through a fusing press (JR-600S, manufactured by Asahi Corporation, processing length of 1340 mm, cylinder pressure) under conditions of temperature at 100° C., pressure at 0.4 MPa, and a feed rate at 1 m/min. Accordingly, a prepreg with fiber weight per unit area of 125 g/m² and a resin content of 28% by mass was obtained.

Then, 18 sheets of the obtained prepreg were laminated to have [0°]₁₈ and, after covering them with a nylon bag film, they were kept in an autoclave. Subsequently, the pressure inside the autoclave was adjusted to 0.04 MPa, the pressure inside the bag film was lowered to be vacuumed, and the temperature inside the autoclave was raised to 80° C. with rate of 2° C./minute. After being maintained at 80° C. for 60 minutes, it was further heated to 130° C. with rate of 2° C./minute. Meanwhile, when the pressure inside the autoclave reached 0.14 MPa in accordance with temperature increase, the pressure inside the bag film was brought back to atmospheric pressure. After raising the internal pressure of the autoclave to 0.6 MPa, it was maintained at the same pressure.

By heating and curing the laminated prepregs in the film bag for 90 minutes at 130° C., a fiber-reinforced plastic panel was obtained.

<Measurement of Bending Strength of Fiber-reinforced Plastics>

The fiber-reinforced plastic panel obtained from the above <Method for producing fiber-reinforced plastic panel> was processed to a test piece with following shape.

Test piece for evaluating 0° bending property: length of 100 mm×width of 12.7 mm, L/d=40

Test piece for evaluating 90° bending property: length of 60 mm×width of 12.7 mm, L/d=16

At that time, processing was performed such that the reinforcing fibers were aligned at 0° or 90° relative to the length direction of a test piece. Subsequently, by using a universal testing instrument manufactured by Instron Corporation and a three-point bending jig (load applicator R=5 mm, support R=3.2 mm) under conditions of temperature at 23° C. and humidity of 50% RH, and having distance (L) between supports of a jig and thickness (d) of the test piece set as L/d and a crosshead speed (rate per minute)=($L^2$× 0.01)/(6×d), the test piece was bent, and then the bending strength, the elastic modulus, and the strain at break were measured for 0° and 90°. The 0° bending property was converted to have a (Vf) of 60%. The results are shown in Table 4.

TABLE 4

|  |  |  | Example 21 | Example 22 | Example 23 | Comparative Example 12 | Comparative Example 13 |
|---|---|---|---|---|---|---|---|
| Composition | Component (A) | AER4152 | 54 | 49 | 45 | 54 | 43 |
|  | Component (B-1) | GAN | 18 | 0 | 0 | 0 | 0 |
|  |  | GOT | 0 | 9 | 3 | 0 | 17 |
|  | Component (C) | jER1002 | 0 | 13 | 12 | 0 | 0 |
|  |  | jER1055 | 18 | 0 | 0 | 13 | 0 |
|  | Component (D) | YP70 | 9 | 4 | 4 | 4 | 9 |
|  | Component (E) | DiCY15 | 5 | 6 | 5 | 5 | 7 |
|  | Component (F) | DCMU | 3 | 4 | 3 | 4 | 5 |
|  | Component (G) | jER828 | 10 | 12 | 10 | 11 | 14 |
|  |  | jER807 | 0 | 18 | 16 | 22 | 0 |
|  | Other epoxy resins | N775 | 0 | 0 | 0 | 0 | 26 |
| Bending of cured resin product | Bending | Strength [MPa] | 166 | 167 | 161 | 155 | 185 |
|  |  | Elastic modulus [GPa] | 3.6 | 3.5 | 3.4 | 3.2 | 4.0 |
|  |  | Strain at break [%] | 9 | 13 | 12 | 13 | 6 |
| Composite bending | 90° bending | Strength [MPa] | 108 | 103 | 102 | 92 | 82 |
|  |  | Elastic modulus [GPa] | 7.0 | 7.0 | 7.5 | 7.6 | 8.0 |
|  |  | Strain at break [%] | 1.4 | 1.4 | 1.3 | 1.1 | 1.0 |
|  | 0° bending Converted to V.F. 60% | Strength [MPa] | 1510 | 1570 | 1670 | 1360 | 1440 |
|  |  | Elastic modulus [GPa] | 204 | 205 | 204 | 205 | 205 |
|  |  | Strain at break [%] | 0.7 | 0.8 | 0.8 | 0.7 | 0.7 |
| Lap shear |  | Strength [MPa] | — | 10.5 | 11 | — | 8.4 |

Examples 24 to 26 and Comparative Example 14

An epoxy resin composition was prepared in the same manner as Example 12 except that the raw materials described in Table 5 were used. Accordingly, a cured resin plate was produced in the same manner as Example 12. By using the obtained cured resin, the resin bending elastic modulus and the resin bending strain at break were measured in the same manner as Example 12. The results are shown in Table 5.

Furthermore, by using the obtained epoxy resin composition and according to <Method for producing fiber-reinforced plastic panel> described above, a fiber-reinforced plastic was produced. Next, the measurement was carried out by using the fiber-reinforced plastic according to <Measurement of bending strength of fiber-reinforced plastics> described above. The results are shown in Table 5.

TABLE 5

|  |  |  | Example 24 | Comparative Example 14 | Example 25 | Example 26 |
|---|---|---|---|---|---|---|
| Composition | Component (A) | AER4152 | 50 | 30 | 55 | 40 |
|  | Component (B-2) | EX731 | 5 | — | 5 | 10 |

TABLE 5-continued

| | | Example 24 | Comparative Example 14 | Example 25 | Example 26 |
|---|---|---|---|---|---|
| Component (C) | jER1002 | 15 | — | 10 | 20 |
| | jER1055 | — | 10 | — | — |
| Component (D) | YP-70 | — | 10 | 6 | 5 |
| | YP-50S | 6 | — | 6 | 5 |
| Component (E) | DICY15 | 6 | 8 | 6 | 6 |
| Component (F) | DCMU99 | 4 | 5 | 4 | 4 |
| Other epoxy resins | jER828 | — | 16 | 12.2 | 12.2 |
| | GAN | — | 20 | — | — |
| | jER807 | 37 | — | 25 | 30 |
| | N775 | — | 30 | — | — |
| | MX-113 | — | 12 | — | — |
| Bending of cured resin product | Strength [MPa] | 164 | 175 | 164 | 163 |
| | Elastic modulus [GPa] | 3.5 | 3.7 | 3.6 | 3.6 |
| | Strain at break [%] | 13 | 7 | 10 | 11 |
| Composite bending | 90° bending Strength [MPa] | 107 | 88 | 101 | 102 |
| | Elastic modulus [GPa] | 7.1 | 7.9 | 7.3 | 7.3 |
| | Strain at break [%] | 1.4 | 1.1 | 1.3 | 1.3 |
| | 0° bending Converted to V.F. 60% Strength [MPa] | 1390 | 1500 | 1700 | 1710 |
| | Elastic modulus [GPa] | 207 | 210 | 197 | 198 |
| | Strain at break [%] | 0.68 | 0.72 | 0.88 | 0.89 |

Examples 27 and 28 and Comparative Examples 15 to 17

By using the epoxy resin compositions which had been prepared in Examples 1 and 24, and Comparative Examples 1, 2 and 14, a prepreg was produced in the following order. By using the obtained prepreg, a golf club shaft was molded in the following order. For the obtained golf club shaft, FLEX measurement, three-point shaft bending strength measurement, thread cutting test, and izod impact test were carried out. The results are shown in Table 6.

<Method for Producing Prepreg for Golf Club Shaft>

The epoxy resin composition shown in Table 6 was heated to 60° C. to 65° C. depending on the viscosity and was coated using a film coater on a release paper, thereby a resin film was produced. Thickness of the resin film was set such that the prepreg resin content was 25% by mass in a case in which a prepreg was produced by using two pieces of the resin films as described below.

Carbon fibers (TR 50S, manufactured by Mitsubishi Rayon Co., Ltd.) were evenly aligned to obtain a sheet with fiber weight per unit area of 125 g/m², and then introduced into an apparatus for producing a prepreg. The carbon fiber sheet was sandwiched between the above two resin films. Then, the carbon fiber sheet sandwiched between the two resin films was heated to 100° C. by using a roll, and pressed such that the carbon fiber sheet was fully impregnated in the resin composition. Accordingly, a prepreg with fiber weight per unit area of 125 g/m² and resin content of 25% by mass was obtained. Prepregs of each Example and Comparative Example obtained as described above were designated as prepregs 1-1, 2-1, 3-1,4, and 5, respectively, as described in Table 6.

Prepregs were further produced in the same manner as above except that carbon fibers (HR 40, manufactured by Mitsubishi Rayon Co., Ltd.) were used. The obtained prepregs were designated as prepregs 1-2, 2-2, and 3-2, respectively, as described in Table 6.

<Manufacturing of Golf Club Shaft>

A mandrel 10 having a shape shown in FIG. 1 was prepared. The mandrel 10 is made of iron, and with regard to the whole length L3, it has a conical trapezoid shape in which the outer diameter starting from the small diameter end P1 to the position (change point) P2 along the length L1 gradually increases while the outer diameter starting from the change point P2 to the large diameter end P3 along the length L2 remains constant.

Meanwhile, specific outer diameter, length, and tapering rate at each position of the mandrel 10 are as described below.

The outer diameter of the small diameter end P1 was 5.00 mm, the outer diameter of the change point P2 was 13.50 mm, and the outer diameter from the change point P2 to the large diameter end P3 remained constant (13.50 mm). The length L1 from the small diameter end P1 to the change point P2 was 1000 mm, and the length L2 from the change point P2 to the large diameter end P3 to was 500 mm. Thus, the whole length L3 of the mandrel 10 was 1500 mm. Furthermore, the tapering rate from the small diameter end P1 to the change point P2 was 8.50/1000.

(Shaft Test 1)

By cutting the prepreg 1-2, a first winding sheet 1 (FIG. 2B) was produced, and by cutting the prepreg 1-1, a second to a fifth winding sheets 2, 3, 4, and 5 (FIG. 2C to FIG. 2F) were produced.

Herein, for the first winding sheet 1, two pieces of prepregs 1-2 in which carbon fiber alignment direction is +45° or −45° relative to the lengthwise direction of a shaft were prepared, and they were laminated in a staggered manner, that is, 9 mm at the small diameter side and 21 mm at the large diameter side of the mandrel.

Subsequently, from the position 60 mm apart from the small diameter end to the position 1165 mm apart from the small diameter end of the mandrel 10 shown in FIG. 2A, the first winding sheet to the fifth winding sheet 1, 2, 3, 4, and 5 were wound in turn as shown in FIG. 2B to FIG. 2F. On top of the sheet, a polypropylene tape with thickness of 30 μm×width of 20 mm was wound with 2 mm pitch followed by fixing. The resultant was heated for 2 hours at 145° C. to cure the prepreg. After that, the mandrel 10 was removed and the polypropylene tape was peeled off, and 10 mm was cut off from each of both ends to have length of 1145 mm. Subsequently, by polishing the surface using a polishing device, a golf club shaft for a wood was obtained.

(Shaft Test 2)

A golf club shaft for a wood was obtained in the same manner as the shaft test 1 except that the first winding sheet 1 was produced by using the prepreg 2-2 and the second winding sheet to the fifth winding sheet 2, 3, 4, and 5 were produced by using the prepregs 2-1.

(Shaft Test 3)

A golf club shaft for a wood was obtained in the same manner as the shaft test 1 except that the first winding sheet 1 was produced by using the prepreg 3-2 and the second winding sheet to the fifth winding sheet 2, 3, 4, and 5 were produced by using the prepregs 3-1.

(Shaft Test 4)

By cutting the prepreg 4, the first winding sheet to the fourth winding sheet 1', 2', 3', 4', and 5' (FIG. 3B to FIG. 3F) were produced.

Herein, for the first winding sheet 1', two pieces of prepregs 4 in which carbon fiber alignment direction is +45° or −45° relative to the lengthwise direction of a shaft were prepared, and they were laminated in a staggered manner, that is, 9 mm at the small diameter side and 21 mm at the large diameter side. Subsequently, from the position 80 mm apart from the small diameter end to the position 1165 mm apart from the small diameter end of the mandrel 10 shown in FIG. 3A, the first winding sheet to the fifth winding sheet 1', 2', 3', 4', and 5' were wound in turn as shown in FIG. 3B to FIG. 3F. On top of the sheet, a polypropylene tape with thickness of 30 μm×width of 20 mm was wound with 2 mm pitch followed by fixing. The resultant was heated for 2 hours at 145° C. to cure the prepreg. After that, the mandrel 10 was removed and the polypropylene tape was peeled off, and 10 mm was cut off from each of both ends to have length of 1145 mm. Subsequently, by polishing the surface using a polishing device, a golf club shaft for a wood was obtained.

(Shaft Test 5)

A golf club shaft for a wood was obtained in the same manner as the shaft test 4 except that the prepreg 5 was used.

(FLEX Measurement)

The obtained golf club shaft was fixed at the position which is 920 mm apart from the small diameter end. After applying a 1 kg load to the position which is 10 mm apart from the small diameter end of a shaft, the warpage of the small diameter end of a shaft was measured. The results are shown in Table 6.

(Method for Measuring Three Point Shaft Bending Strength)

According to Type C of three point shaft bending strength measurement on the basis of "accreditation criteria and criterion confirmation method for golf club shaft" (approved by Minister of Ministry of International Trade and Industry, 5 san, No. 2087, Oct. 4, 1993) set by Consumer Product Safety Association, a three point bending test was performed for the obtained golf shaft. Meanwhile, for this time, the test was performed 5 to 10 times for each of the loading point T (90 mm apart from the small diameter end of a shaft), loading point B (525 mm apart from the small diameter end of a shaft), and loading point C (993 mm apart from the small diameter end of a shaft) according to "a torsional test of the accreditation criterion and criterion confirmation method". The results are shown in Table 6.

(Measurement Method for Thread Cutting Test)

According to the distortion test on the basis of a torsional test of the "accreditation criteria and criterion confirmation method for golf club shaft" (approved by Minister of Ministry of International Trade and Industry, 5 san, No. 2087, Oct. 4, 1993) set by Consumer Product Safety Association, a thread cutting test was performed for the obtained golf club shaft.

By using a 5 KN universal tester manufactured by Mechatronics Engineering Co, Ltd., the shaft was fixed at the small diameter end. According to application of torque to the large diameter end, when distorted break of the shaft occurs, the torque at that moment was determined as torsion strength. The results are shown in Table 6.

(Measurement Method for Izod Impact Test)

A length of 60 mm was cut from the small diameter end of the obtained golf club shaft to obtain a test piece for izod impact test. As for the izod impact test, a jig 20 shown in FIG. 4A was fixed onto an izod impact tester (capacity of 29.4 N·m) manufactured by Ueshima Seisakusho Co., Ltd. based on JIK K 7110, a test piece 30 was inserted by 30 mm into the jig 20 as shown in FIG. 4B, and after hitting the position which is 22 mm apart from the top of the jig with a hammer, the impact absorption energy was measured. Meanwhile, the top part (the hitting side) of the jig for impact test has been previously subjected to chamfering (2R), and the gap between the test piece and the impact test jig was not adhered. Furthermore, the test piece was not subjected to cutting (notching). The measurement results are shown in Table 6.

TABLE 6

|  |  |  | Example 27 | Comparative Example 15 | Comparative Example 16 | Example 28 | Comparative Example 17 |
|---|---|---|---|---|---|---|---|
| Shaft test |  |  | 1 | 2 | 3 | 4 | 5 |
| Epoxy resin composition used |  |  | Example 1 | Comparative Example 1 | Comparative Example 2 | Example 2 | Comparative Example 14 |
| Lamination pattern |  |  | 1 | 1 | 1 | 2 | 2 |
| Prepreg Number | CF | TR50 | 1-1 | 2-1 | 3-1 | 4 | 5 |
|  |  | HR40 | 1-2 | 2-2 | 3-2 |  |  |
| Evaluation of cured resin product |  |  |  |  |  |  |  |
| Resin bending | Elastic modulus | (GPa) | 3.5 | 3.1 | 3.6 | 3.5 | 3.7 |
|  | Strain at break | (%) | 13 | 13 | 8 | 13 | 7 |
| Evaluation of fiber-reinforced plastics |  |  |  |  |  |  |  |
| Composite 90° bending | Strength | (MPa) | 103 | 108 | 101 | 107 | 88 |
|  | Strain at break | (%) | 1.4 | 1.5 | 1.3 | 1.4 | 1.1 |

TABLE 6-continued

|  |  |  | Example 27 | Comparative Example 15 | Comparative Example 16 | Example 28 | Comparative Example 17 |
|---|---|---|---|---|---|---|---|
| Shaft evaluation |  |  |  |  |  |  |  |
| Original tube after polishing | Weight | (g) | 53 | 53 | 52 | 50 | 49 |
| FLEX measurement | Warpage | (mm) | 75 | 75 | 75 | 72 | 77 |
| Thread cutting test | Breakage torque | kgf·m | 2.8 | 2.4 | 2.2 | 2.6 | 2 |
| Three-point shaft bending strength | T | (kgf) | 1.91 | 166 | 184 | 172 | 168 |
|  | B | (kpf) | 95 | 87 | 82 | 81 | 79 |
|  | C | (kpf) | 104 | 101 | 92 | 79 | 71 |
| Izod impact test | Strength | kgf·cm | 139 | 137 | 109 | 135 | 89 |
| Lap shear | Strength | MPa | 10.5 | — | — | 10.4 | 9.0 |

INDUSTRIAL APPLICABILITY

With use of the epoxy resin compositions of the present invention, an application can be made to a molded product of a fiber-reinforced plastic with excellent mechanical properties, for example, from a molded product for sports and leisure applications to a molded product for industrial applications such as aircrafts. In particular, a fiber-reinforced plastic tubular body with high fracture strength can be obtained by the present invention, and it is very effective for use in sports and leisure applications such as golf club shaft.

DESCRIPTIONS OF LETTERS OR NUMERALS

10 Mandrel
20 Jig
30 Test piece
1 First winding sheet for Test 1 to Test 3
2 Second winding sheet for Test 1 to Test 3
3 Third winding sheet for Test 1 to Test 3
4 Fourth winding sheet for Test 1 to Test 3
5 Fifth winding sheet for Test 1 to Test 3
1' First winding sheet for Test 4 and Test 5
2' Second winding sheet for Test 4 and Test 5
3' Third winding sheet for Test 4 and Test 5
4' Fourth winding sheet for Test 4 and Test 5
5' Fifth winding sheet for Test 4 and Test 5

The invention claimed is:

1. An epoxy resin composition, comprising an epoxy resin and a curing agent, and satisfying the following (1), (2), and (3):
   (1) a bending elastic modulus of a cured product of the epoxy resin composition is 3.3 GPa or higher;
   (2) a bending strain at break of the cured product of the epoxy resin composition is 9% or higher; and
   (3) a fiber-reinforced plastic a formed of the cured product of the epoxy resin composition and a reinforcing fiber substrate in which carbon fibers, which are continuous fibers, are evenly aligned in one direction has 90° bending strength of 95 MPa or higher,
   wherein the epoxy resin comprises:
   (A) an oxazolidone ring-containing epoxy resin, which is not a glycidylamine epoxy resin, in an amount of 30 parts by mass to 70 parts by mass;
   (B-1) a glycidylamine epoxy resin not having an oxazolidone ring in an amount of 1 part by mass to 30 parts by mass;
   (C) a bisphenol bifunctional epoxy resin having the number average molecular weight of 600 or more, which does not have oxazolidone ring and is not a glycidylamine epoxy resin, in an amount of 5 parts by mass to 30 parts by mass;
   (D) a phenoxy resin in an amount of 1 part by mass to 15 parts by mass; and
   (E) a curing agent in an amount of 1 part by mass to 25 parts by mass,
   each of the amounts of (A), (B-1), (C), (D), and (E) being relative to 100 parts by mass of a total amount of all epoxy resins contained in the epoxy resin composition.

2. The epoxy resin composition according to claim 1, wherein the 90° bending strain at break of the fiber-reinforced plastic α is 1.3% or higher.

3. A film, comprising the epoxy resin composition according to claim 1.

4. The epoxy resin composition according to claim 1, further comprising:
   (G) a low viscosity epoxy resin, which does not contain an oxazolidone ring and is neither a diglycidylamine epoxy resin nor glycidylphthalimide,
   wherein a total amount of the components (A), (B-1), (C), and (G) is 75 parts by mass or more relative to 100 parts by mass of the total amount of the epoxy resin contained in the epoxy resin composition.

5. The epoxy resin composition according to claim 1, wherein the epoxy resin composition further satisfies the following (4):
   (4) a tensile lap-shear strength is 9.5 MPa or higher when measurement is made based on JIS K 6850 by using A5052 aluminum as a subject for adhesion.

6. The epoxy resin composition according to claim 1, wherein the component (B-1) is glycidylaniline.

7. The epoxy resin composition according to claim 1, wherein the component (B-1) is N,N-diglycidyl-o-toluidine.

8. The epoxy resin composition according to claim 1, wherein a number average molecular weight of the component (B-1) is 300 or less.

9. A prepreg comprising a reinforcing fiber substrate and the epoxy resin composition according to claim 1 impregnated in the reinforcing fiber substrate.

10. A fiber-reinforced plastic, comprising a cured product of the epoxy resin composition according to claim 1 and a reinforcing fiber.

11. The fiber-reinforced plastic according to claim 10 having a tubular shape.

12. An epoxy resin composition, comprising an epoxy resin and a curing agent, and satisfying the following (1), (2), and (3):
   (1) the bending elastic modulus of a cured product of the epoxy resin composition is 3.3 GPa or higher;

(2) the bending strain at break of the cured product of the epoxy resin composition is 9% or higher; and
(3) the fiber-reinforced plastic a formed of the cured product of the epoxy resin composition and a reinforcing fiber substrate in which carbon fibers, which are continuous fibers, are evenly aligned in one direction has 90° bending strength of 95 MPa or higher,
wherein the epoxy resin comprises:
(A) an oxazolidone ring-containing epoxy resin, which is not a glycidylamine epoxy resin, in an amount of 30 parts by mass to 70 parts by mass;
(B-2) glycidylphthalimide in an amount of 1 part by mass to 15 parts by mass;
(C) a bisphenol bifunctional epoxy resin having the number average molecular weight of 600 or more, which does not have an oxazolidone ring and is not a glycidylamine epoxy resin, in an amount of 5 parts by mass to 30 parts by mass;
(D) a phenoxy resin in an amount of 1 part by mass to 15 parts by mass; and
(E) a curing agent in an amount of 1 part by mass to 25 parts by mass,
each of the amounts of (A), (B-2), (C), (D), and (E) being relative to 100 parts by mass of a total amount of all epoxy resins contained in the epoxy resin composition.

13. The epoxy resin composition according to claim 12, wherein the 90° bending strain at break of the fiber-reinforced plastic a is 1.3% or higher.

14. A film, comprising the epoxy resin composition according to claim 12.

15. The epoxy resin composition according to claim 12, further comprising:
(G) a low viscosity epoxy resin, which does not contain an oxazolidone ring and is neither a diglycidylamine epoxy resin nor glycidylphthalimide,
wherein a total amount of the components (A), (B-2), (C), and (G) is 75 parts by mass or more relative to 100 parts by mass of the total amount of the epoxy resin contained in the epoxy resin composition.

16. A prepreg comprising a reinforcing fiber substrate and the epoxy resin composition according to claim 12 impregnated in the reinforcing fiber substrate.

17. A fiber-reinforced plastic, comprising a cured product of the epoxy resin composition according to claim 12 and a reinforcing fiber.

18. The fiber-reinforced plastic according to claim 17 having a tubular shape.

* * * * *